(12) United States Patent
Kini et al.

(10) Patent No.: US 12,578,463 B1
(45) Date of Patent: Mar. 17, 2026

(54) SENSOR SYSTEM

(71) Applicant: Gatik AI Inc., Mountain View, CA (US)

(72) Inventors: Ashwath Kini, Mountain View, CA (US); Andreas Bauer, Mountain View, CA (US); Peter A. Forbes, Mountain View, CA (US); Dharmateja Kadem, Mountain View, CA (US); Apeksha Kumavat, Palo Alto, CA (US); Arjun Narang, Palo Alto, CA (US); Gautam Narang, Palo Alto, CA (US)

(73) Assignee: Gatik AI Inc., Mountain View, CA (US)

( * ) Notice: Subject to any disclaimer, the term of this patent is extended or adjusted under 35 U.S.C. 154(b) by 0 days.

(21) Appl. No.: 19/221,267

(22) Filed: May 28, 2025

Related U.S. Application Data

(60) Provisional application No. 63/730,746, filed on Dec. 11, 2024.

(51) Int. Cl.
| | |
|---|---|
| *G01S 13/931* | (2020.01) |
| *B60R 9/048* | (2006.01) |
| *G01S 7/497* | (2006.01) |

(52) U.S. Cl.
CPC ............ *G01S 13/931* (2013.01); *B60R 9/048* (2013.01); *G01S 7/4972* (2013.01); *B60R 2300/301* (2013.01); *G01S 2013/93273* (2020.01)

(58) Field of Classification Search
CPC ................ G01S 13/931; G01S 7/4972; G01S 2013/93273; B60R 9/048; B60R 2300/301
See application file for complete search history.

(56) References Cited

U.S. PATENT DOCUMENTS

| | | | | |
|---|---|---|---|---|
| 11,186,234 | B2 * | 11/2021 | McKendrick | B60R 19/483 |
| 11,729,520 | B2 * | 8/2023 | Nie | H04N 23/90 |
| | | | | 348/148 |
| 2010/0230566 | A1 | 9/2010 | Neufeglise | |
| 2019/0204845 | A1 | 7/2019 | Grossman et al. | |
| 2019/0248421 | A1 * | 8/2019 | Jacobsthal | B62D 25/06 |
| 2021/0034060 | A1 * | 2/2021 | Patnaik | B60W 60/001 |
| 2021/0178983 | A1 * | 6/2021 | Daly, Jr. | G01S 17/86 |
| 2022/0043157 | A1 * | 2/2022 | Chen | G01S 17/931 |
| 2023/0047330 | A1 | 2/2023 | Burnette et al. | |
| 2023/0173937 | A1 | 6/2023 | Dudar | |
| 2023/0243676 | A1 * | 8/2023 | Lawrence | G01B 11/272 |
| | | | | 73/1.01 |
| 2024/0034278 | A1 * | 2/2024 | Herse | B60S 1/487 |
| 2024/0369387 | A1 | 11/2024 | Zhang | |

* cited by examiner

*Primary Examiner* — Timothy A Brainard
(74) *Attorney, Agent, or Firm* — Jeffrey Schox; Diana Lin

(57) ABSTRACT

In variants, the system can include a vehicle and a set of sensor assemblies, wherein at least one of the sensor assemblies includes a set of sensors mounted to a dimensional layer configured to align and retain the sensor positioning relative to each other; and a structural layer mounting the dimensional layer and configured to structurally support and mount the dimensional layer to the vehicle.

19 Claims, 24 Drawing Sheets

Vehicle 100

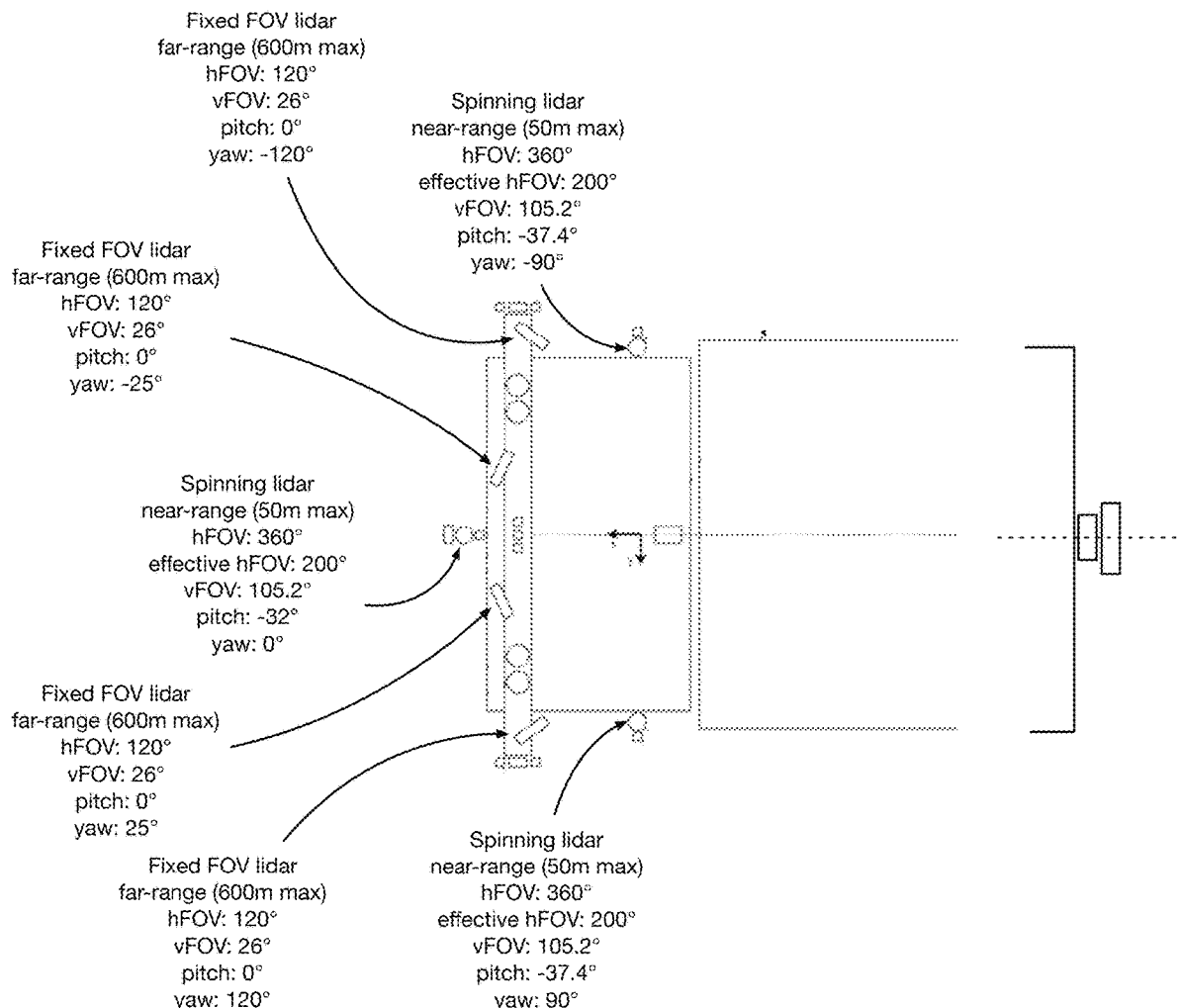

Fixed FOV lidar
far-range (600m max)
hFOV: 120°
vFOV: 26°
pitch: 0°
yaw: -120°

Spinning lidar
near-range (50m max)
hFOV: 360°
effective hFOV: 200°
vFOV: 105.2°
pitch: -37.4°
yaw: -90°

Fixed FOV lidar
far-range (600m max)
hFOV: 120°
vFOV: 26°
pitch: 0°
yaw: -25°

Spinning lidar
near-range (50m max)
hFOV: 360°
effective hFOV: 200°
vFOV: 105.2°
pitch: -32°
yaw: 0°

Fixed FOV lidar
far-range (600m max)
hFOV: 120°
vFOV: 26°
pitch: 0°
yaw: 25°

Fixed FOV lidar
far-range (600m max)
hFOV: 120°
vFOV: 26°
pitch: 0°
yaw: 120°

Spinning lidar
near-range (50m max)
hFOV: 360°
effective hFOV: 200°
vFOV: 105.2°
pitch: -37.4°
yaw: 90°

FIGURE 3B

Fisheye camera FOV

Lidar FOV

Lidar FOV

Lidar FOV

Lidar FOV

Camera FOV

Camera FOV

Camera FOV

Camera FOV

Camera FOV

Lidar FOV

Lidar FOV

Cameras

Radar    Camera

Camera

SENSOR SYSTEM

CROSS-REFERENCE TO RELATED APPLICATIONS

This application claims the benefit of U.S. Provisional Application No. 63/730,746 filed 11 Dec. 2024, which is incorporated in its entirety by this reference.

TECHNICAL FIELD

This invention relates generally to the autonomous vehicle field, and more specifically to a new and useful sensor stack in the autonomous vehicle field.

BRIEF DESCRIPTION OF THE FIGURES

FIGS. 3A-C are illustrative examples of variants of sensor specifications and orientations.

DETAILED DESCRIPTION

The following description of the embodiments of the invention is not intended to limit the invention to these embodiments, but rather to enable any person skilled in the art to make and use this invention.

1. Overview

Figure 1:
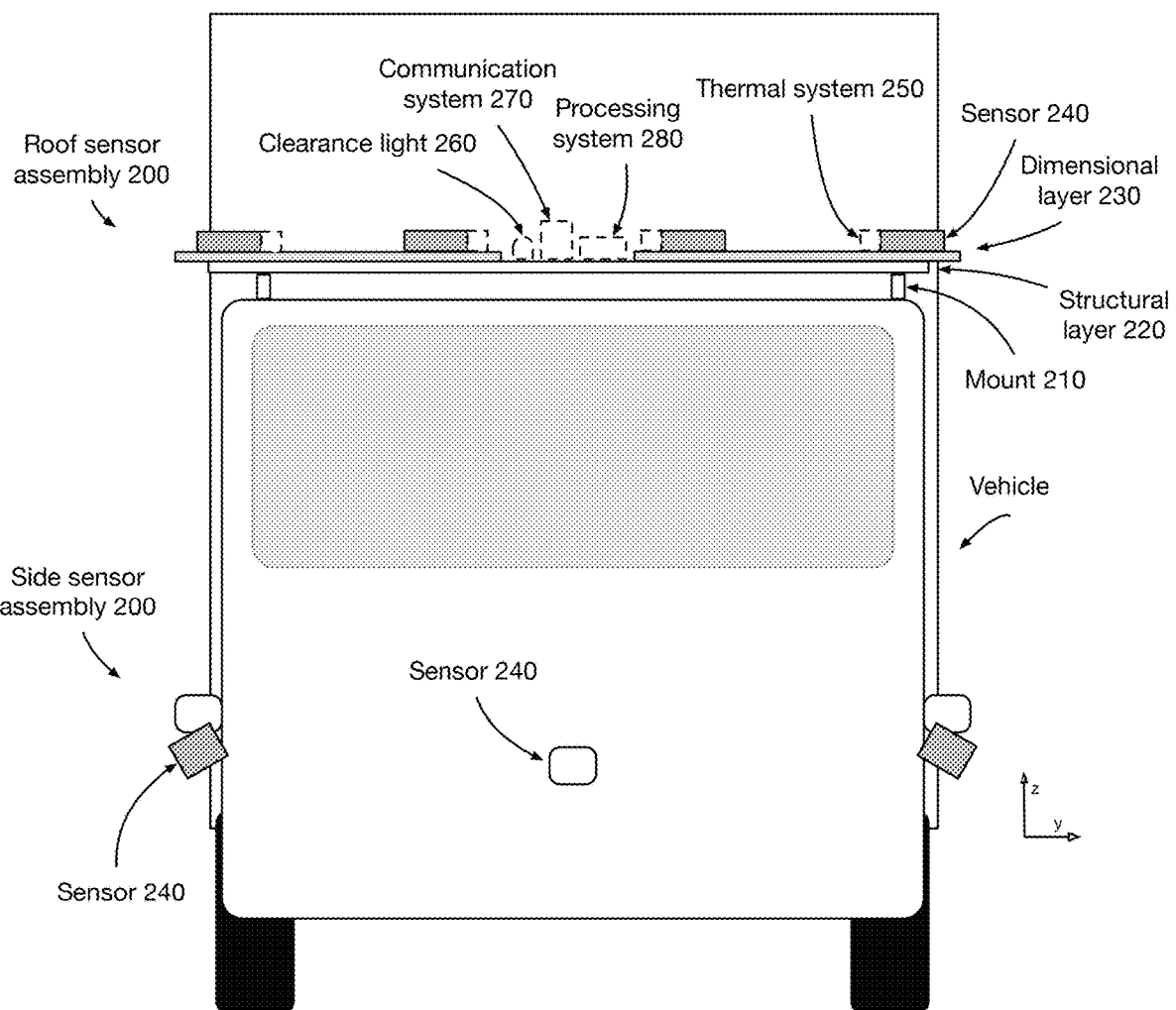
FIG. 1 is an illustrative example of a variant of the system.

In variants, the system can include a vehicle 100; sensor assembly 200; mount 210; mounting features 10; structural layer 220; dimensional layer 230; set of sensors 240; thermal system 250; clearance lights 260; communication system 270; processing system 280; actuating connector 290 and/or any other suitable components. An example is shown in FIG. 1.

In variants, the system can include a vehicle and a set of sensor assemblies (e.g., a roof assembly mounted to the vehicle roof and/or side assemblies mounted to the side of the vehicle). The sensor assemblies can include a set of mounts, a structural layer, a dimensional layer, a set of sensors, communication systems, processing systems, and/or any other suitable system components (e.g., examples shown in FIG. 1).

In an illustrative example, the system can include an autonomous vehicle 100 (e.g., a cabover truck, a class 6 truck, a class 8 truck, etc.) with a set of sensor assemblies 200 arranged on the roof of the vehicle and/or the sides of the vehicle (e.g., on the front, lateral sides, back, etc.). One or more of the sensor assemblies can include a frame including a set of mounts 210, a structural layer 220, and a dimensional layer 230; a set of sensors 240; and optionally a thermal system 250; set of clearance lights 260 a set of communication systems 270, a set of processing systems 280, and/or other components. The set of mounts can have an adjustable position (e.g., an adjustable lateral position) relative to the structural layer, enabling the roof sensor assembly to mount to vehicles of varying dimensions without adjusting the shape of the structural and/or dimensional layers. The structural layer can support the dimensional layer, which in this illustrative example can include a pair of dimensional plates, wherein each dimensional plate is positioned at opposing lateral sides of the sensor assembly. Each dimensional plate can include sensor mounting features constraining motion of the sensors (e.g., cameras, lidar, radar, IMUs, etc.) relative to each other and relative to other system components.

Figure 2:
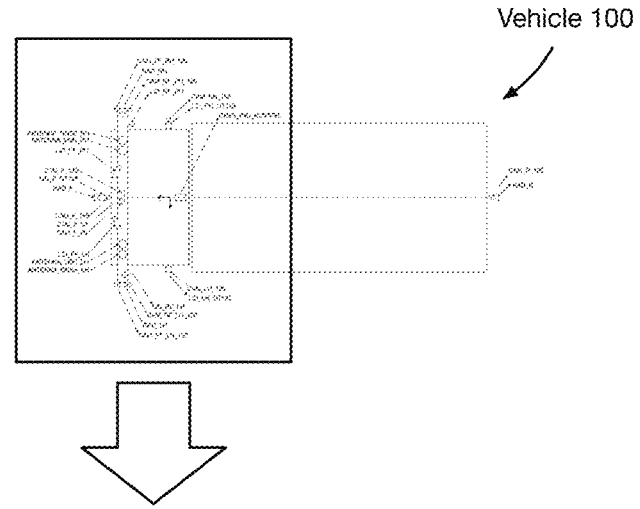
FIG. 2 is an illustrative example of a variant of sensor types and
   locations.
Figure 2:
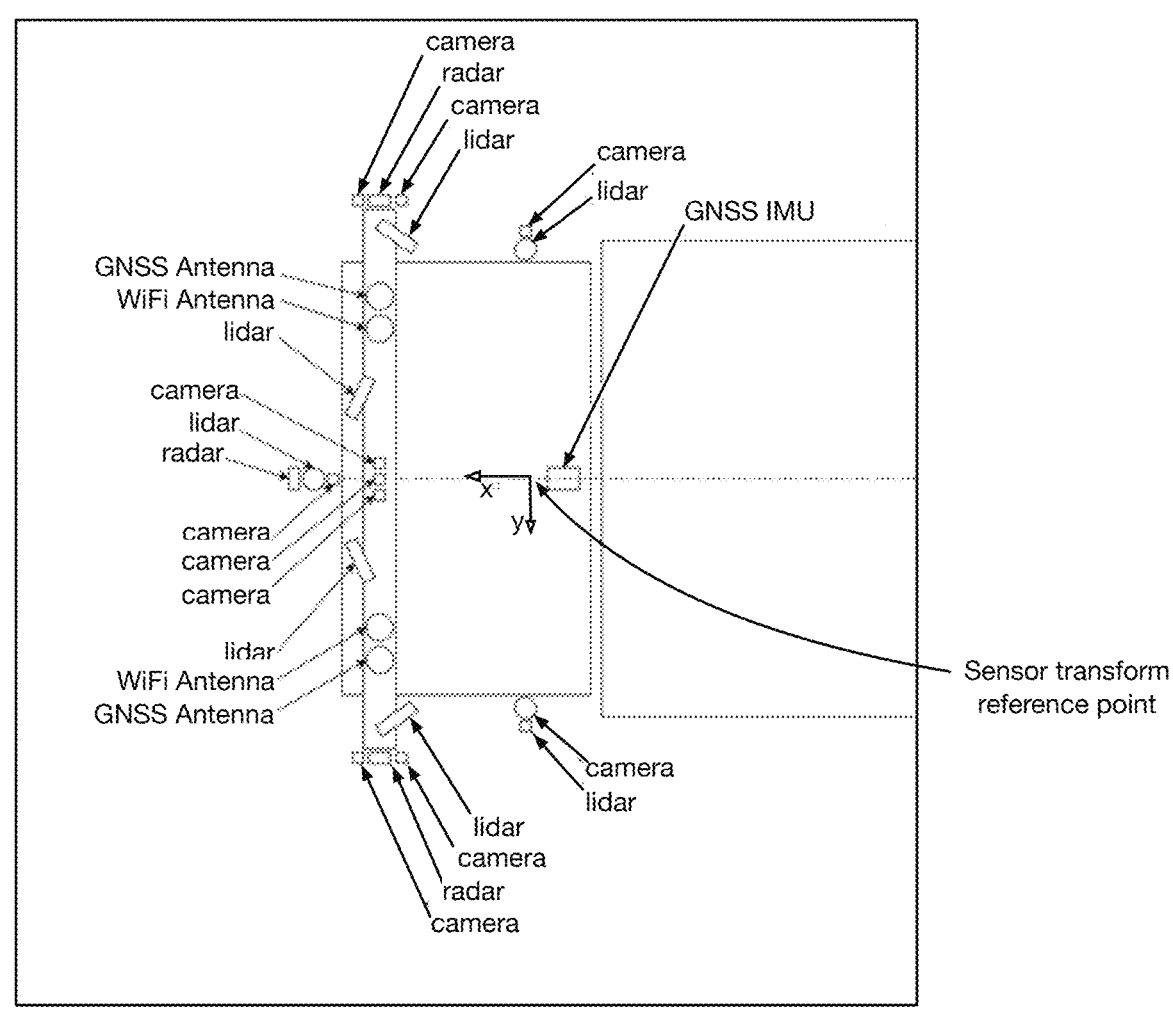

In examples, the roof sensor assembly can span a lateral distance across a top of the truck cab and can include multiple sensors (e.g., cameras, lidars, radars, etc.) oriented in different directions to cooperatively capture measurements of a wide region around the vehicle (e.g., example shown in FIG. 2).

In examples, the side sensor assemblies (e.g., auxiliary sensor assemblies) can be mounted to sides of the vehicle (e.g., front, back, left, right, and/or other side of a truck cab), and can each include a set of sensors calibrated with one another as well as with sensors on the roof sensor assembly.

In examples, the system can include a set of near-range multimodal sensors oriented and arranged to capture overlapping measurements of a region close to the vehicle; as well as a set of medium-range and/or far-range multimodal sensors oriented and arranged to cooperatively capture overlapping measurements of a region further from the vehicle than the region close to the vehicle. In examples, the set of near-range multimodal sensors can be mounted to sides of the vehicle.

However, the system can be otherwise configured.

2. Technical Advantages

Variants of the technology can confer one or more advantages over conventional technologies.

First, variants of the technology can provide enhanced flexibility in system implementation and deployment. For example, the adaptable architecture can accommodate various vehicle types (e.g., truck cab types). In examples, the sensors can be calibrated relative to each other before installation and statically retained relative to each other by the dimensional layer, which can enable the sensor assembly to be re-installed on other vehicles without relative recalibration. Furthermore, the dimensional layer (e.g., dimensional plates) can retain the relative positions of the sensors in high-vibration environments and/or operating contexts (e.g., driving) with a high degree of precision. Furthermore, the separability of structural and dimensional layers can enable easier installation, higher precision of relative positions of sensors, and/or confer other benefits.

Second, variants of the technology can improve sensor coverage of the area surrounding the vehicle. For example, instead of using a rotating sensor (e.g., rotating scanning lidar) variants of the system can use a set of solid state sensors. This can enable more sensing time, sensor data storage, and/or sensor datum (e.g., pixels) to be dedicated to regions of interest, instead of obstructed regions (e.g., sensing resources can be allocated to regions of interest instead of monitoring the truck box).

Third, variants of the technology can provide improve the consistency and/or accuracy of sensor measurements from sensors mounted onboard vehicles with different configurations (e.g., different base chassis, wheelbase length, rear overhang, liftgate configuration, etc.). By clustering each of a subset of the set of sensors, calibrating each subset of sensors (e.g., cluster) to a subset-specific reference origin, and optionally generating a transform of each subset relative to a desired vehicle reference point, the system can facilitate simpler pre-calibration, reduced effort when changing configurations (e.g., of sensors and/or of a host vehicle, etc.), and/or easier measurement of sensors relative to relatively distant vehicle reference components (e.g., a front sensor to a distant rear axle, etc.).

However, further advantages can be provided by the system and method disclosed herein.

In variants, the system can include a vehicle 100; sensor assembly 200; mount 210; mounting features 10; structural layer 220; dimensional Layer 230; set of sensors 240; thermal system 250; clearance lights 260; communication system 270; processing system 280; actuating connector 290 and/or any other suitable components.

The system functions to capture measurements of an environment around an autonomous vehicle.

The vehicle 100 functions to move through the environment. The vehicle 100 preferably defines a longitudinal axis and a transverse/lateral axis perpendicular to the longitudinal axis, but can alternatively define any other suitable axis configuration and/or orientation. The vehicle 100 is preferably fully autonomous, but can alternatively be partially autonomous (Level 1, 2, 3, 4, or 5), or non-autonomous (e.g., Level 0; sensor assembly provides data from perception but not control). The vehicle 100 can switch between levels of autonomy and/or any other suitable operational modes. The vehicle 100 is preferably a truck, but can alternatively be a car, plane, motorcycle, motorbike, and/or any other suitable vehicle type. The truck can be of trucking classes including: class 1, 2a, 2b, 3, 4, 5, 6, 7, 8, and/or any other suitable class. The vehicle 100 is preferably a cabover truck (e.g., cab over engine (COE), cab forward truck, flat face truck, etc.) where the cab of the truck sits above or forward of the front axle, but can alternatively be a conventional truck or long-nose truck. In variants, the vehicle 100 is preferably a class 6 or class 7 cabover truck, but can alternatively be any other suitable class truck.

The vehicle 100 can include a truck cab, a chassis, a truck body, and/or other components (e.g., a lift gate).

The truck cab can mount the sensor assembly, processing units, vehicle controls, and/or any other suitable components. The truck cab can include a cabin for a driver but can alternatively be cabinless.

The truck cab can be mounted to a chassis (e.g., wherein the truck cab sits on top of the chassis). The truck cab can actuate relative to the chassis (e.g., to provide engine access, etc.) without loss of connectivity, or without the need to disconnect any cables.

The truck body can be connected to the truck cab through the chassis (e.g., mounted to the top of the chassis), by a 5th wheel, and/or any other suitable connection mechanism. Truck bodies that are connected to the truck cab can vary in width, height, length, and/or any other suitable dimensions. The truck body width can be between 80-102 inches or any range or value therebetween (e.g., 80 inches, 85, 90, 92, 95, 96, 100, 102). The range can alternatively be less than 80 inches or greater than 102 inches. The truck body height can be between 40-162 inches or any range or value therebetween (e.g., 40 inches, 60, 79, 85, 91, 97, 103, 109, 162). The range can alternatively be less than 40 inches or greater than 162 inches. The truck body preferably has a maximum height higher than the truck cab, but can alternatively not. The truck body length can be between 6'-30' or any range or value therebetween (e.g., 6', 8'10', 12', 14', 16', 18', 20', 24', 28', 30', etc.). The range can alternatively be less than 6' or greater than 30'. The truck body can optionally be arranged in a roadtrain. In variants, the truck body can include a dry box, a refrigerated box with a 'reefer' unit that may or may not include a side access door, and/or any other suitable truck body components.

However, the vehicle 100 may be otherwise configured.

The sensor assembly 200 functions to obtain raw data of the operating environment for perception operations for the vehicle. The sensor assembly 200 can operate alone or alongside (e.g., in communication with, calibrated with, etc.) other sensor assemblies of the vehicle and/or any other suitable operational configuration.

Figure 11:
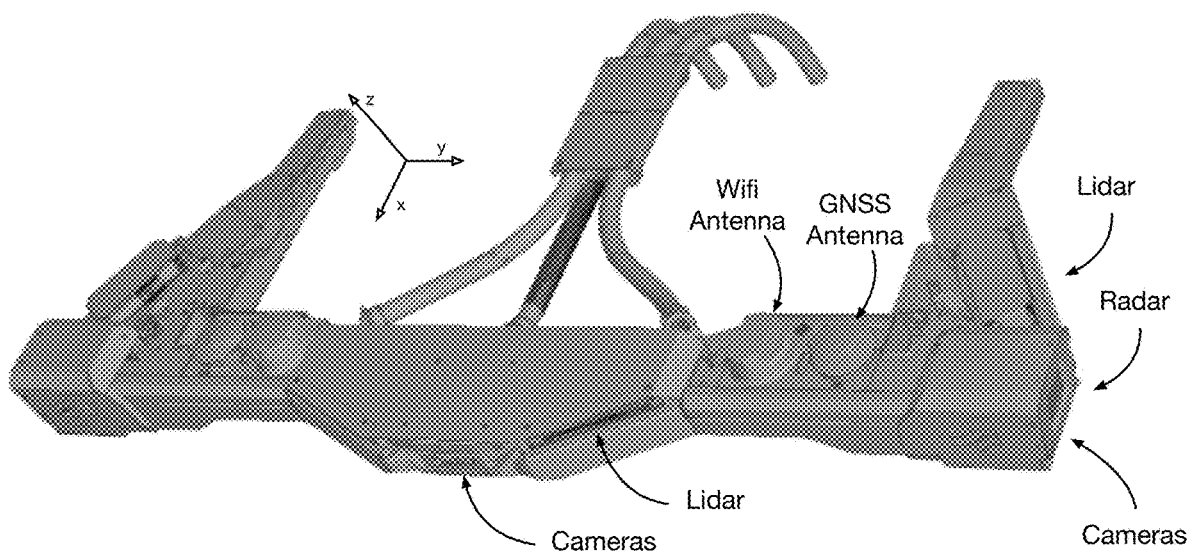
FIG. 11 is a view of a variant of a roof sensor assembly.
Figure 19:
FIG. 19 is an illustrative example of a variant of the system.

The sensor assembly 200 can be arranged on the roof of the truck cab or truck body (e.g., "roof sensor assembly", "roof assembly"; example shown in FIG. 11), but can additionally or alternatively be arranged on a side of a truck cab or truck body (e.g., "side sensor assembly"). An example is shown in FIG. 19. The side can include a front side, lateral side, rear side, corner, edge, and/or any other suitable side location.

The sensor assembly 200 preferably includes multiple sensors, but can alternatively include a single sensor. The sensor assembly 200 preferably includes sensors of multiple types (e.g., different sensor modalities), but can alternatively include a single sensor modality and/or any other suitable sensor configuration.

The sensor assembly 200 can include a housing enclosing the sensors or shielding regions of the sensors. The sensors can alternatively sit on top of the housing. Alternatively, the sensor assembly 200 can omit a housing. The housing can be translucent or transparent, wherein sensors can capture measurements through the housing. The housing can alternatively be opaque. In an example, multiple sensors can be positioned behind a single transparent housing section.

The sensor assembly 200 can have various dimensional characteristics. The roof sensor assembly width along the transverse axis can be the same width as the cab, slightly wider than the cab (e.g., by 1 inch, 2 inches, 3 inches, 4 inches, 5 inches, etc.), be 90 inches, 94 inches, 96 inches, 98 inches, 100 inches, 101 inches, 101.5 inches, 102 inches, 106 inches, and/or any other suitable width.

In variants, components of the roof sensor assembly can have and/or include actuating connectors 290. In this variant, the roof assembly can be operable between a narrow mode (e.g., wherein a lateral width of the roof assembly and/or component thereof is less than a threshold width) and an wide mode (e.g., wherein a lateral width of the roof assembly and/or component thereof is greater than a threshold width). The threshold width can be 96 in, 97 in, 98 in, 99 in, 100 in, 100.5 in, 101.5 in, 102 in, 102 in, 103 in, within an open or closed range bounded by the aforementioned values, and/or any other suitable value. Additionally or alternatively, the roof sensor assembly can be static The roof sensor assembly height (e.g., above the mounting points) can be 8 inches 10 inches, 12 inches, 16 inches, 20 inches, 30 inches, within an open or closed range bounded by the aforementioned values, and/or any other suitable value.

The roof assembly vertical position relative to ground can be 6 ft, 8 ft, 10 ft, 12 ft, 14 ft, within an open or closed range bounded by the aforementioned values, and/or any other suitable value.

The side sensor assembly vertical position relative to ground can be 1 ft, 2 ft, 3 ft, 4 ft, 5 ft, 6 ft, within an open or closed range bounded by the aforementioned values, and/or any other suitable value.

Components of the sensor assembly can be otherwise positioned relative to the vehicle, ground, and/or other reference point.

However, the sensor assembly 200 may be otherwise configured.

Figure 15:
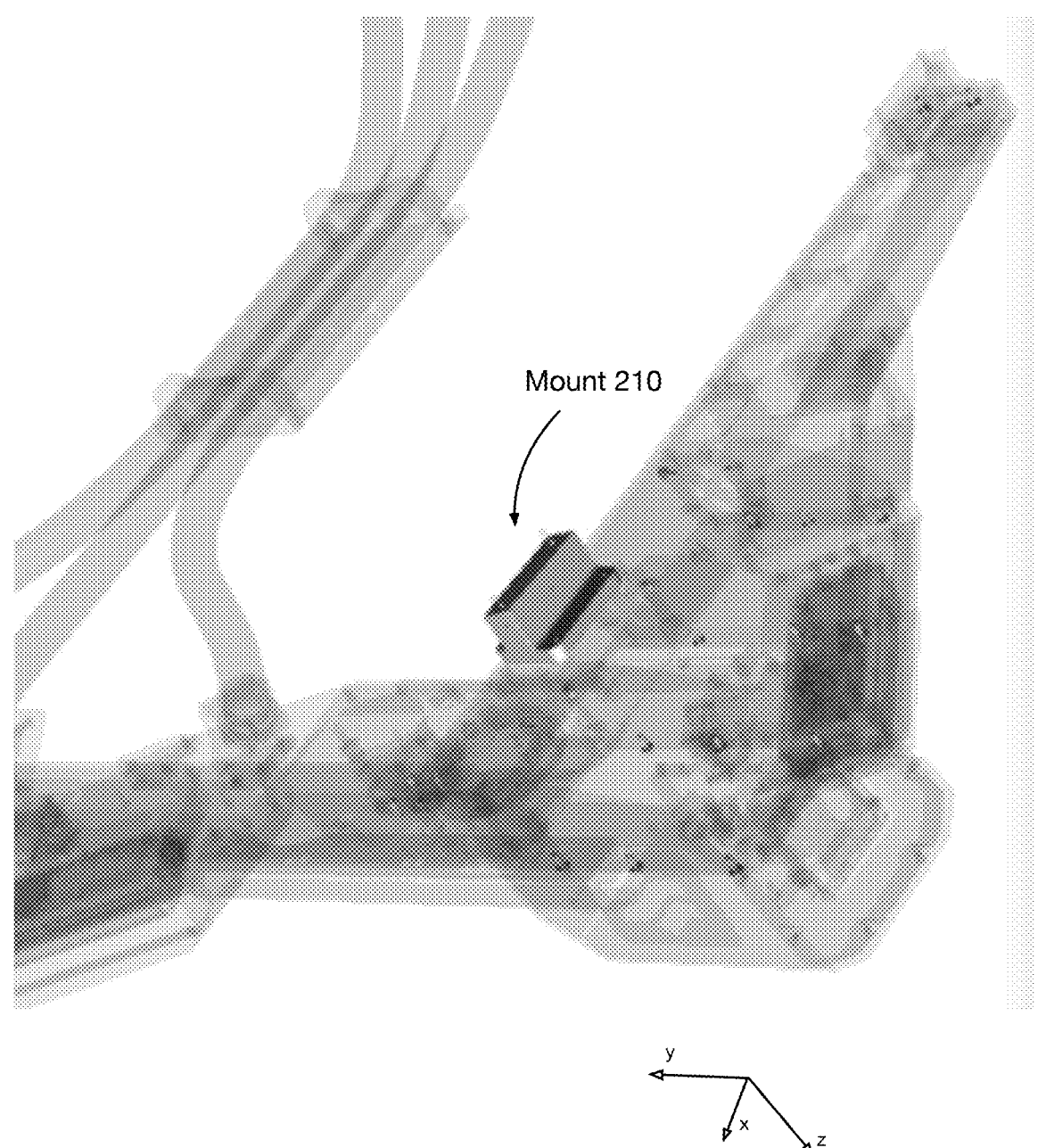
FIG. 15 is a view of a variant of a mount.

The mount 210 functions to connect the sensor assembly to a vehicle interface of the vehicle. The mount 210 can be adjustable (e.g., the mounting position on the cab or on the structural layer can be dynamically selected) such that an installer can change the relative position of mounts before and/or during installation of the sensor assembly onto the vehicle. An example is shown in FIG. 15. The mount 210 is preferably static after installation, but can alternatively be adjustable after installation.

The mount 210 preferably connects to a mounting feature of the vehicle interface to a mounting feature of the structural layer, but can alternatively connect to other suitable mounting features.

Figure 21A:
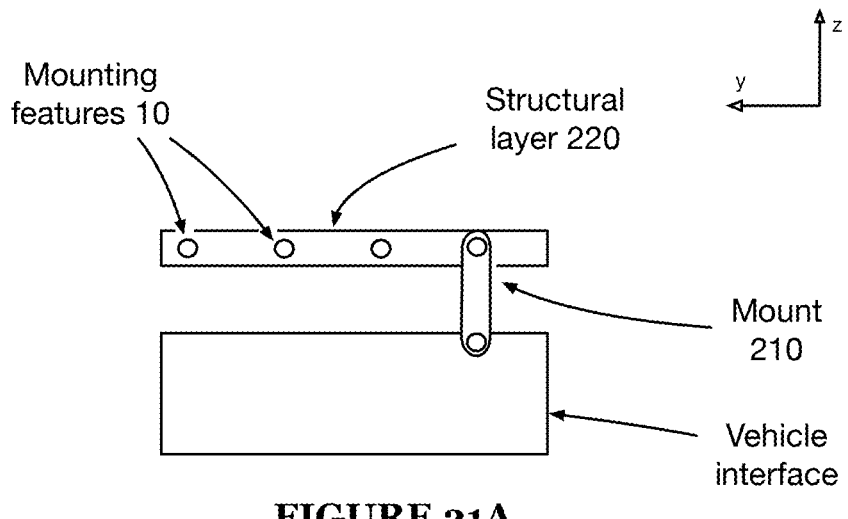
FIGS. 21A-21C are illustrative examples of variants of mount types.
Figure 21B:
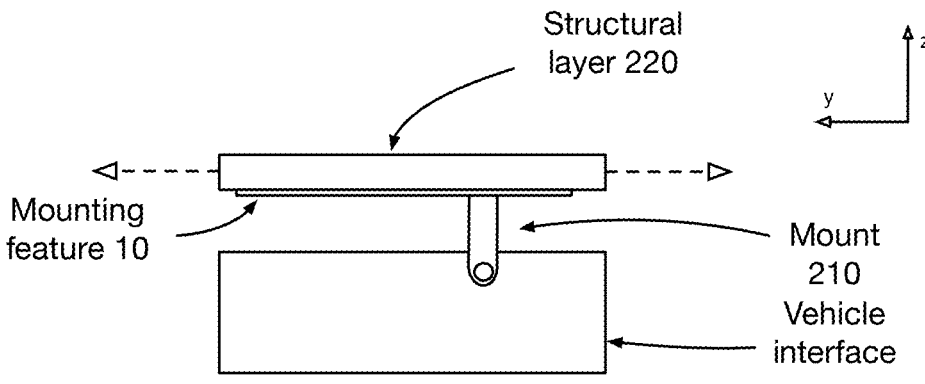
Figure 21C:
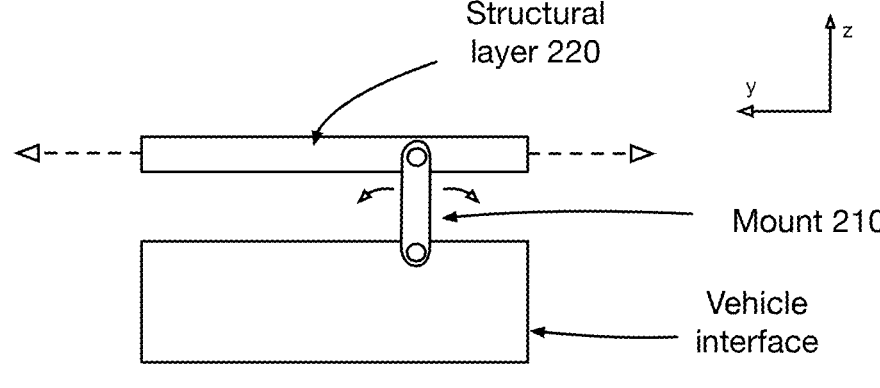

The mount 210 can mount to a vehicle interface. The vehicle interface can include: a roof rack (and/or crossbars thereof), roof panel, roof rail system, roof header assembly, vehicle frame (e.g., upper frame), A-pillar, B-pillar, C-pillar, door sill, front/rear bumpers, vehicle grille, side mirror, quarter panels, license plate mount, side mirrors, windshield/window glass (e.g., in front of or behind glass), wheel well, and/or any other suitable vehicle interface components. The mount 210 can be mounted to the vehicle interface using: clips, mounts, suction cup, bolts (e.g., with reinforced hardpoints integrated with the vehicle interface), adhesive, threaded inserts in a reinforced vehicle interface element, and/or any other suitable mounting mechanism. Examples are shown in FIGS. 21A-21C.

The sensor assembly preferably includes four mounts 210, but can alternatively include 1, 2, 3, 6, 8, 10, 12 mounts, a number of mounts within an open or closed range bounded by the aforementioned values, and/or any other suitable number of mounts. The mount 210 can be vehicle-specific (e.g., the only vehicle-specific component of the sensor assembly), but can alternatively be not vehicle-specific. The mount 210 is preferably removably mounted to the vehicle (e.g., not integrated with vehicle assembly), but can alternatively be permanently mounted to the vehicle or integrated with the vehicle. The mount 210 can include an interior channel for communication wires, power wires, control wires (e.g., into vehicle cab, etc.), and/or any other suitable wires, but can alternatively not include an interior channel. The mount 210 can include a set of vibration damping elements between the mount and the vehicle interface (e.g., rubber spacer, etc.).

The mount 210 is preferably adjustable pre-installation and not post-installation, but can additionally or alternatively be adjustable post installation, not be adjustable, and/or be otherwise adjustable The mount 210 is preferably statically mounted to the vehicle, but can alternatively be actuatably mounted to the vehicle post-installation (e.g., laterally adjustable, vertically adjustable, longitudinally adjustable, etc.).

The mount 210 preferably has or is capable of mounting to multiple candidate mounting points relative to the sensor assembly (e.g., is adjustable to accommodate different truck or cab widths), but can alternatively not have multiple candidate mounting points. The mount 210 preferably constrains longitudinal and/or vertical motion between vehicle interface and sensor assembly, but can alternatively not constrain motion along those axes. Each mount 210 can have the same degrees of freedom, but can alternatively have different degrees of freedom (e.g., mount on one lateral side is constrained in x and y direction, mount on opposite lateral side constrained in longitudinal direction).

The mount 210 can mount to one or more mounting points defined on the sensor assembly and/or the vehicle. In an example, the mount 210 can have an adjustable position relative to the structural layer of the sensor assembly (e.g., pre-installation). The mounting points can have different lateral positions (e.g., relative to the vehicle), longitudinal positions, and/or any other suitable positions.

In a first variant, the mount 210 statically mounts the sensor assembly to the vehicle. The mounts are fixed to the vehicle and a structural layer of the sensor assembly, wherein the vehicle and/or structural layer define multiple mounting location options (e.g., mounting features) for the mounts. The mounting location options can be discrete (e.g., mounting holes) or continuous (e.g., different positions along a lateral track) and/or any other suitable mounting location configuration. In an example, the mounts can connect to any subset of a set of mounting features of the structural layer.

In a second variant, the mount 210 can be statically mounted to the sensor assembly and the vehicle, but the mount can be actuatable (e.g., includes a hinge, rotary joint, etc.). In this variant, the mounts can be fixed to the vehicle and structural layer of sensor assembly, wherein the mount itself can include a motion feature (e.g., hinge, track, etc.) facilitating relative motion of the structural layer and sensor assembly. The motion feature can be locked and unlocked. The motion feature can use any of the mechanisms which the actuating connector 290 can use (e.g., linear slide lock, etc.).

In a first variant, the mount locations can be determined based on vehicle mounting features (e.g., predetermined).

In a second variant, the mount locations can be determined using an over-vehicle fixture to locate mount locations relative to vehicle component (e.g., front axle center, etc.), sensor assembly component (e.g., roof sensor assembly center), and/or any other suitable reference points.

In a third variant, the mount locations can be determined using 3D laser scanners.

However, the mount 210 may be otherwise configured.

The mounting features 10 (e.g., example shown in FIG. 21A-C) function to enable different system components to be mounted to each other. The mounting features 10 can control the position, orientation, and/or pose of system components (e.g., sensor assembly components) relative to each other (e.g., during installation, after installation, etc.). The mounting features 10 can be part of a vehicle interface, mounts, structural layer, dimensional layer, sensors, and/or any other suitable components. The mounting features 10 can include a set of holes for a system component (e.g., mount) to reversibly directly mount to (e.g., for adjustment of mount positions relative to each other), and/or be otherwise defined. The mounting features 10 can include holes (e.g., threaded or non-threaded), bushings, reference surfaces, dowels (e.g., sized for holes on a mounting feature of an opposite part, etc.), tracks, and/or any other suitable mounting feature types.

The mounting features 10 can have different tolerances. The mounting features 10 preferably have different tolerances within the same component (e.g., dimensioning layer has lower tolerances for mounting features for attaching to sensors than for mounting features for attaching to the structural layer), but can alternatively have the same tolerance for different mounting features in the same sensor assembly component. The tolerance for mounting feature position relative to other mounting features and/or mounting feature size can be within 10 mm, 5 mm, 2 mm, 1 mm, 0.5 mm, 0.1 mm, 0.05 mm, 0.01 mm, 0.005 mm, and/or any other suitable tolerance value. The system components (e.g., a structural layer) can include one or more mounting features 10 at different locations to provide options for different/changing arrangements of an opposite part (e.g., a mount) and/or any other suitable arrangements. The mounting features 10 can be located at any suitable position on the system components.

However, the mounting features 10 may be otherwise configured.

The structural layer 220 functions to support components of the sensor assembly, bear the load of the remainder of the sensor assembly, control the deflection of the sensor assembly (e.g., provide flexion stability, other deflection control, etc.), mount the remainder of the sensor assembly components to the vehicle, and/or provide other support functions.

The structural layer 220 can have different shapes and configurations. In a first variant, the structural layer 220 can be a roof frame extending laterally across the roof of the vehicle. In a second variant, the structural layer 220 can be or include a housing mounted to the side of the vehicle.

The structural layer 220 can have a width (e.g., along the transverse axis of the vehicle) of 90 inches, 94 inches, 96 inches, 98 inches, 100 inches, 101 inches, 101.5 inches, 102 inches, 106 inches, within an open or closed range bounded by the aforementioned values, and/or any other suitable value. The structural layer 220 can have fixed dimensions and/or can be adjustable (e.g., between aforementioned dimensions). When the structural layer is adjustable, the structural layer can be adjusted manually, via actuators, and/or any other suitable adjustment mechanism.

The structural layer 220 can be made of one or more static members. Examples of static members that can be used include: beams (e.g., I-beams, C-beams, rectangular cross-sectional beams, tubes, etc.), plates, frames, and/or any other suitable structural support member. The structural layer can be aluminum, steel, iron, plastic, and/or any other suitable material.

In a first variant, the structural layer 220 can include a single static frame connected to mounts.

In a second variant, the structural layer 220 can include multiple static frame sections dynamically (e.g., via actuators) or statically connected to each other (e.g., bolted together, welded together, etc.), and/or any other suitable connection configuration.

The structural layer 220 is preferably a single component extending laterally above the vehicle interface (e.g., roof of the cab), but can alternatively be any other suitable configuration.

The structural layer 220 can include a set of mounting features to mount to the vehicle interface, the dimensional layer, the set of sensors, and/or any other suitable components.

In a first variant, the structural layer 220 can include a set of mounting feature options that an installer can selectively use to mount the structural layer to the vehicle interface and/or other sensor assembly component. In an example, an installer can connect mounts to a strict subset of the mounting features defined by the structural layer.

In a second variant, the structural layer 220 includes only one option for each mount (e.g., in variants where the mount itself includes a motion feature enabling connection to differently-laterally-spaced mounting features on a vehicle by actuating laterally).

However, the structural layer 220 may be otherwise configured.

Figure 14:
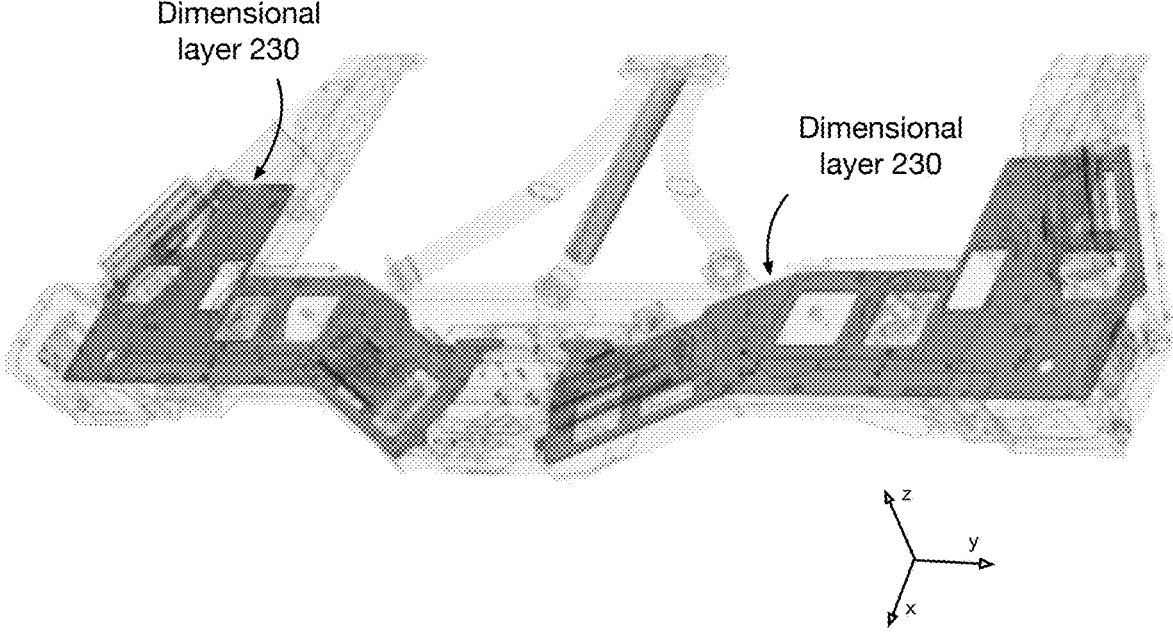
FIG. 14 is a view of a variant of dimensional layers.

The dimensional layer 230 functions to constrain the position, orientation (e.g., yaw, pitch, roll, etc.), and/or pose of sensor assembly components (e.g., sensors) relative to each other. An example is shown in FIG. 14.

In variants, the dimensional layer 230 can include mounting features. In an example, the dimensional layer 230 can include tightly toleranced mounting features. The mounting features can be configured to facilitate attachment, positioning, and/or any other suitable mounting functions.

The dimensional layer 230 can include: a dimensional plate, optical breadboard, machined interface plate, reference surface, and/or any other suitable dimensional layer type. In an example, the dimensional layer 230 and/or sensors can include datum or alignment points detectable by visual measurements (e.g., captured by cameras, etc.) and/or scans for alignment of the dimensional layer and/or cameras relative to the vehicle.

The dimensional layer 230 can include dimensional layer mounting features for the structural layer, sensors, antennae, and/or any other suitable components. The dimensional layer 230 is preferably mounted to the structural layer, which, in turn, is mounted to the vehicle; alternatively, the dimensional layer can be directly mounted to the vehicle or to another mounting surface. The dimensional layer can be mounted to the top, bottom, front, back, side, interior, and/or other surface of the structural layer.

The sensor assembly can include one dimensional layer 230, or alternatively more than one dimensional layer.

In a first variant, the sensor assembly can include a single dimensional layer 230 that extends laterally across the entire roof assembly.

In a second variant, the sensor assembly can include a pair of dimensional layers 230, one on each side of the vehicle (e.g., opposing each other across the vehicle's longitudinal axis). In this variant, each dimensional layer 230 can constrain a different component group (e.g., sensor subset) relative to each other, wherein the structural layer can constrain the pose of the dimensional layers 230 (and therefore each sensor subset) relative to each other.

In a third variant, the sensor assembly can include three dimensional layers 230 (left, right, center), each constraining a different component group.

The pose of the dimensional layer 230 can be determined and used as part of the mounted sensors' extrinsic calibration. In an example, sensor extrinsic calibration can be determined based on the pose of the dimensional layer mounting the sensors. The extrinsic transform of dimensional layer 230 can alternatively be determined based on calibrated transforms of sensors.

The dimensional layer 230 pose can be determined relative to front axle, rear axle, vehicle center, cab center, another sensor, another sensor assembly and/or component thereof, another dimensional layer, and/or any other suitable reference point.

However, the dimensional layer 230 may be otherwise configured.

The set of sensors 240 functions to capture information about the vehicle and/or environment. The set of sensors 240 can include exteroceptive and/or proprioceptive sensors. The set of sensors 240 can include lidar, radar, cameras (e.g., thermal, IR, hyperspectral, polarization cameras, gated cameras with active illumination, wide angle cameras, fisheye cameras, etc.), ultrasonic sensors, GNSS units (e.g., transmitter, receiver, transceiver, etc.), GPS units (e.g., transmitter, receiver, transceiver, etc.), kinematic sensors (e.g., IMU, gyroscope, accelerometer, etc.), temperature sensors (e.g., for detecting environmental temperature and/or system component temperature), humidity sensors, weather sensors, light sensors, and/or any other suitable sensors.

The set of sensors 240 is preferably fixed (e.g., in position, in field of view, etc.), but can alternatively actuate or be adjustable, and/or any other suitable configuration. In an example, the set of sensors 240 can include rotating sensors (e.g., spinning lidar).

The set of sensors 240 preferably includes multiple sensors of each type (e.g., redundant sensors, sensors with overlapping FOV, sensors with non-overlapping FOV, etc.), but can alternatively include any other suitable sensor configuration and/or arrangement.

Figure 16:
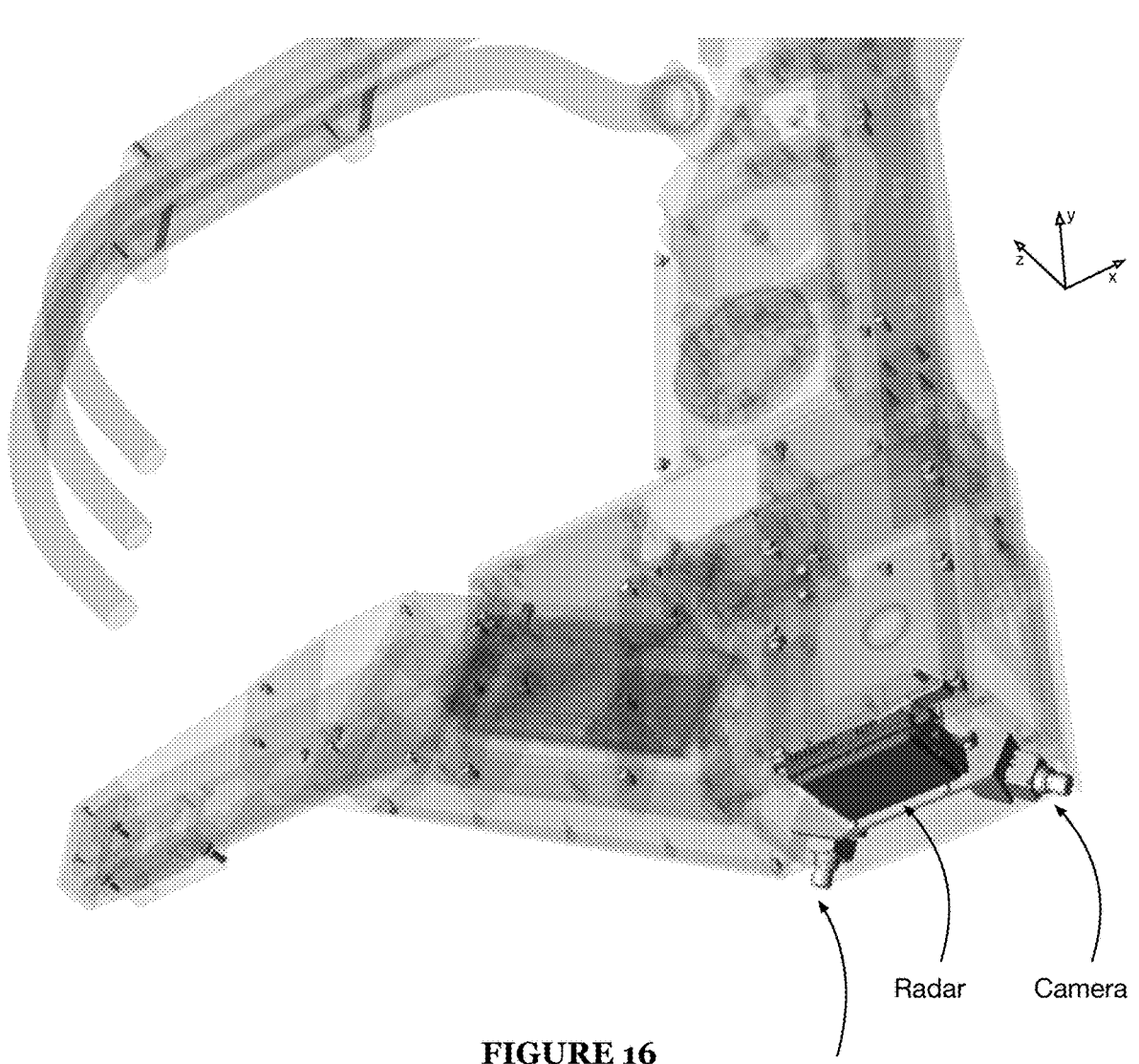
FIG. 16 is a view of a variant of a radar-camera assembly.

The set of sensors 240 is preferably mounted directly to the dimensional layer, but can alternatively be mounted to the structural layer, other sensor (e.g., temperature sensor attached to lidar), and/or any other suitable system component. The sensors can be mounted to the ends of the roof sensor assembly (e.g., example shown in FIG. 16), to the front face of the roof sensor assembly or side assembly, to the top of the roof sensor assembly, to the back of the roof sensor assembly, and/or to any other suitable portion of the roof sensor assembly and/or side assembly.

The set of sensors 240 and/or subsets thereof (e.g., sensor clusters, etc.) can be calibrated relative to a calibration reference or set of calibration references. Calibration references can include hardware-defined reference points, software-defined reference points, and/or reference points defined using any other suitable system. Examples of system components on which calibration reference points can be defined include a front axle of the vehicle, a rear axle of the vehicle, another sensor, the cab, a bumper, a box rear wall, the chassis frame, another sensor assembly and/or component thereof (e.g., dynamic layer, etc.), and/or any other suitable system component. In examples, the reference point can be defined at a center, edge, median, and/or any other suitable point on any of the aforementioned system components. In a first example, a calibration reference can be a virtual point in a sensor subset (e.g., a cluster of sensors at the top front of the vehicle, such as on the roof rack, for example, etc.). In a second example, the calibration reference can be a front axle of the vehicle front axle of the vehicle. In a third example, the sensors can be calibrated relative to a global reference point of the vehicle (e.g., rear axle of the vehicle), wherein a subset of the sensors (e.g., front sensors) can be calibrated relative to a front reference point (e.g., front axle) as an intermediary reference, then converted into the global reference (e.g., based on the calibration between the front reference and the global reference). In operation, sensor measurements can be converted to a rear axle reference frame (e.g., for perception workflows, etc.) using a transformation associated with a known vehicle parameter (e.g., wheelbase length, base chassis type and/or dimensions, rear overhang, liftgate configuration and/or dimensions, chassis sensor positions, etc.; each of which could vary between operation instances). The known vehicle parameters are preferably manually input and stored at the processing system, but can alternatively be automatically determined based on an identifier (e.g., wireless identifier, CAN bus identifier, etc.) of the truck body or otherwise determined. When switching sensors between vehicles or when changing a configuration of a vehicle, the vehicle parameters can be updated, which can effectively automatically update the transform of each sensor relative to a new vehicle reference point. In a specific example, subsets of sensors (e.g., a front cluster of sensors at the roof rack and/or side assemblies, a rear cluster of sensors proximal a rear end of the box, and/or a chassis cluster of sensors underneath the vehicle) are each calibrated first to a local reference point (e.g., a subset-specific vehicle reference point, a rear axle center, a chassis center, respectively, etc.), then based on known vehicle parameters, the poses of each sensor can be transformed into a vehicle space using known and/or updated vehicle parameters.

The set of sensors 240 can be communicatively connected to a single processing system, redundant processing systems (e.g., transmitting redundant information to each processing system via redundant channels, etc.), and/or any other suitable processing system configuration.

One or more of the set of sensors 240 can have a field of view (FOV) type including: conical, pyramidal, cylindrical (e.g., spinning lidar), spherical, linear FOV, and/or any other suitable FOV type. The maximum FOV elevation angle from horizontal of one or more of the sensors can be $-70°$, $-50°$, $-30°$, $-20°$, $-10°$, $-1°$, $0°$, $1°$, $10°$, $20°$, $30°$, $50°$, $70°$, $90°$, $120°$, $150°$, within an open or closed range bounded by the aforementioned values, and/or any other suitable value. The minimum FOV elevation angle from horizontal of one or more of the sensors can be $-91°$, $-90°$, $-89°$, $-80°$, $-70°$, $-50°$, $-30°$, $-20°$, $-10°$, $-1°$, $0°$, $1°$, $10°$, $20°$, within an open or closed range bounded by the aforementioned values, and/or any other suitable value. The total horizontal FOV range of one or more of the sensors can be $10°$, $20°$, $30°$, $50°$, $70°$, $90°$, $120°$, $150°$, $180°$, $360°$, within an open or closed range bounded by the aforementioned values, and/or any other suitable value. The total vertical FOV range of one or more of the sensors can be $10°$, $20°$, $30°$, $50°$, $70°$, $90°$, $120°$, $150°$, $180°$, $360°$, within an open or closed range bounded by the aforementioned values, and/or any other suitable value. The maximum perception range of one or more of the sensors can be 10 m, 20 m, 30 m, 50 m, 100 m, 200 m, 400 m, 500 m, within an open or closed range bounded by the aforementioned values, and/or any other suitable value. The principal axis angle from horizontal (e.g., pitch) for one or more of the sensors can be positive or negative, and can be $-90°$, $-70°$, $-50°$, $-30°$, $-20°$, $-10°$, $-5°$, $-2°$, $-1°$, $0°$, $1°$, $2°$, $5°$, $10°$, $20°$, $30°$, $50°$, $70°$, $90°$, within an open or closed range bounded by the aforementioned values, and/or any other suitable value. For 360° FOV sensors (e.g., lidar), the sensors can be rotated about the longitudinal axis by any of the aforementioned degree values. The principal axis yaw angle from longitudinal axis (e.g., axis along vehicle length) for one or more of the sensors can be positive or negative, and can be −180°, −170°, −160°, −120°, −100°, −90°, −70°, −50°, −30°, −20°, −10°, −5°, −2°, −1°, 0°, 1°, 2°, 5°, 10°, 20°, 30°, 40°, 45°, 50°, 70°, 90°, 100°, 110°, 120°, 160°, 170°, 180°, within an open or closed range bounded by the aforementioned values, and/or any other suitable value.

The set of sensors 240 can be arranged with adjacent fields of view (FOV) (e.g., vertically adjacent, laterally adjacent, etc.), overlapping FOV (e.g., vertically adjacent, laterally adjacent, etc.), and/or any other suitable arrangement. High-risk regions (e.g., regions in front of the vehicle, in the blind spots, etc.) are preferably covered by multiple sensors (e.g., both narrow and wide FOV, multiple modalities, etc.), but can alternatively be covered by a single sensor.

In a first variant, sensors can cooperatively cover a region around the vehicle. In this variant, a set of fixed FOV sensors of a same modality can be arranged relative to each other such that they cooperatively cover a wider azimuthal or vertical range. The number of sensors can be 2, 3, 4, 5, 6, 7, 8, within an open or closed range bounded by the aforementioned values, and/or any other suitable value. The sensors are preferably arranged with overlapping FOV, but can alternatively be arranged with nonoverlapping FOV. The horizontal FOV overlap can be 0°, 1°, 2°, 4°, 10°, 20°, 30°, 50°, 70°, 90°, 100°, 110°, 120°, and/or any other suitable value. The percentage overlap can be 0%, 1%, 5%, 10%, 20%, 50%, 80%, 90%, 95%, 99%, 100%, within an open or closed range bounded by the aforementioned values, and/or any other suitable value. The collectively covered horizontal range can be 120°, 170°, 180°, 190°, 270°, 300°, 330°, 350°, 355°, 360°, within an open or closed range bounded by the aforementioned values, and/or any other suitable value. The horizontal range of the covered region can be measured at any distance from the vehicle (e.g., because horizontal range can vary with distance when sensors are in different positions). The distance can be 5 m, 10 m, 20 m, 30 m, and/or any other suitable distance.

In the first variant, sensors (e.g., lidar) can cooperatively cover almost all regions (e.g., 360°) around the vehicle, except a section directly behind the vehicle (e.g., section=sector, rectangular, trapezoidal, triangular, etc.). The unmonitored section can be 30°, 20°, 10°, 5°, 3°, 2°, 1°, azimuthally, and/or any other suitable angle.

In a second variant, the set of sensors 240 can provide nested coverage of a region (e.g., for varying levels of precision/range). In this variant, a first sensor can have a field of view strictly narrower than a field of view of a second sensor (e.g., horizontally and/or vertically). The first sensor and second sensor can be of the same or different modality. The first sensor preferably has a higher resolution, further range, higher dynamic range, and/or any other suitable characteristics than the second sensor. This can dedicate more pixels to a given feature for more accurate and/or precise perception. In variants, coarse perception can be performed using the second sensor, while fine perception can be performed using the first sensor.

Figure 3A:
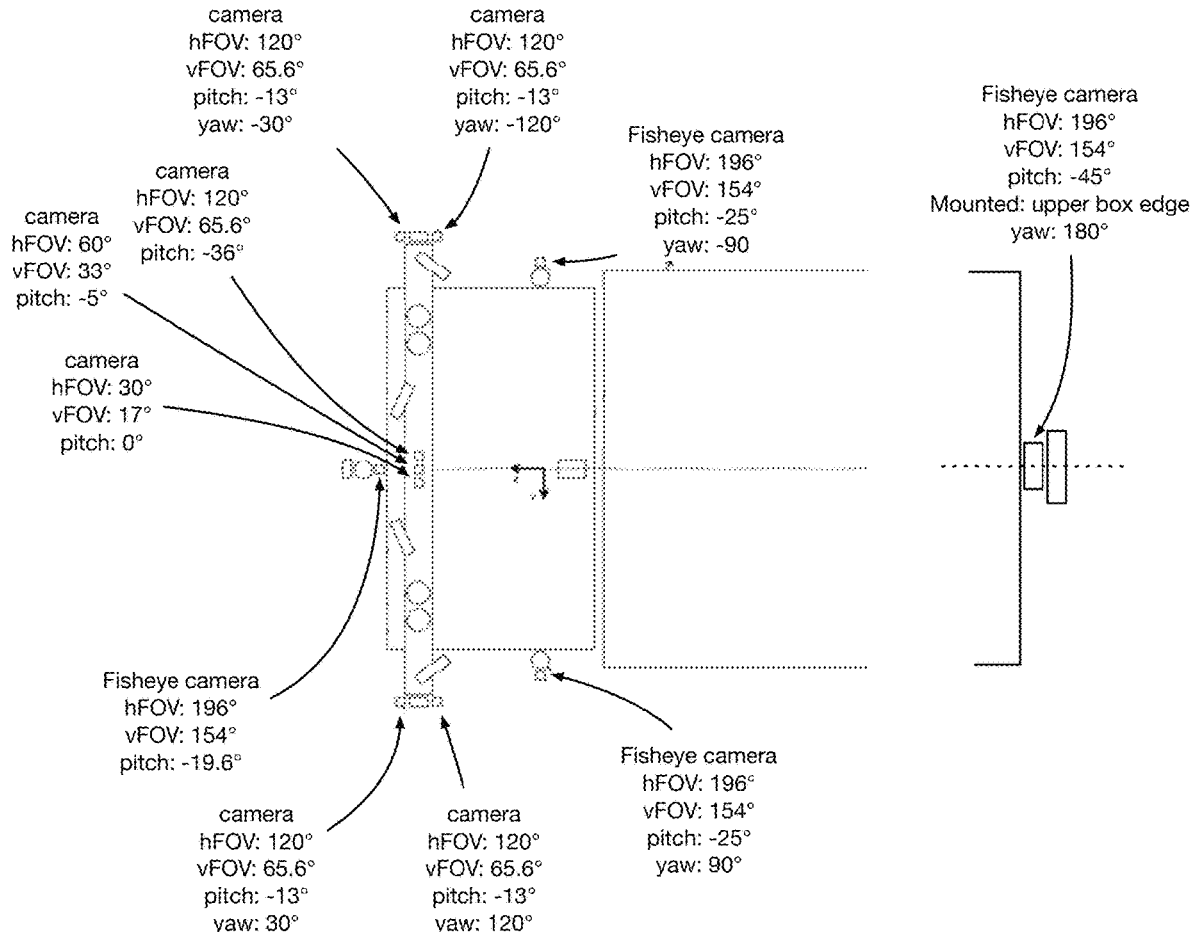
Figure 3C:
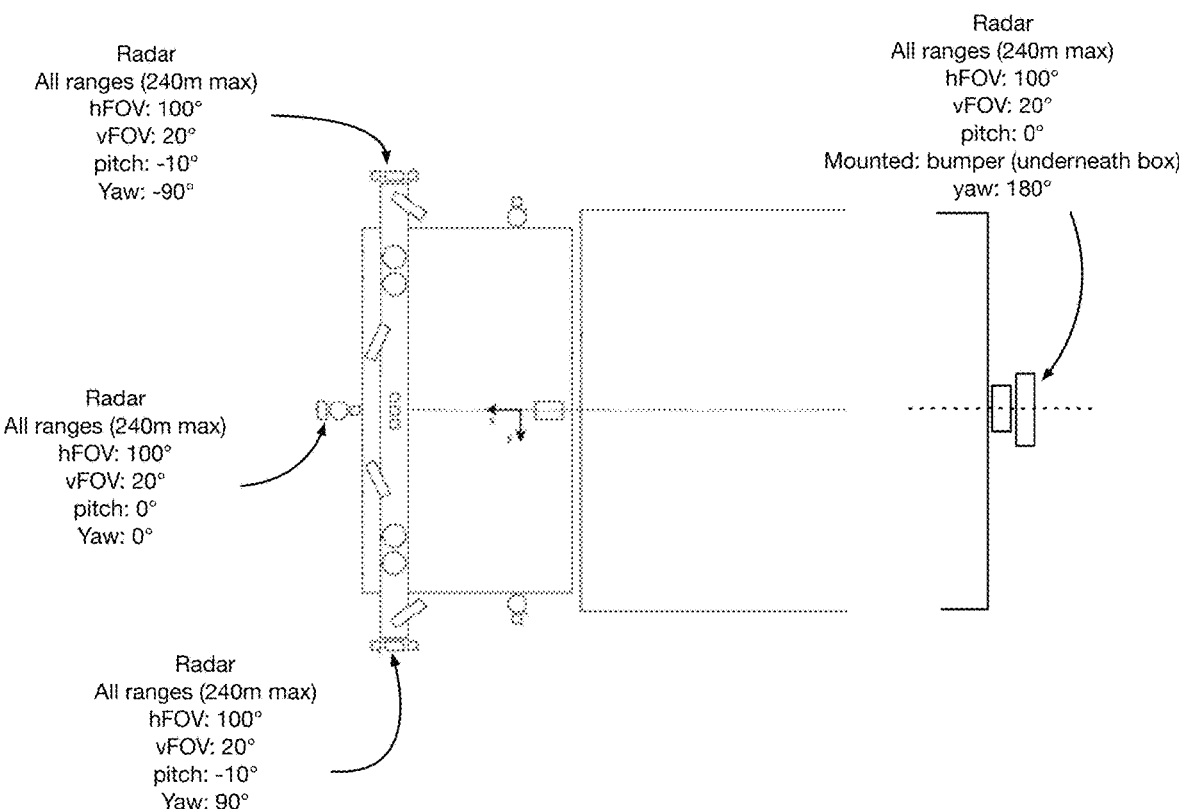
Figure 4:
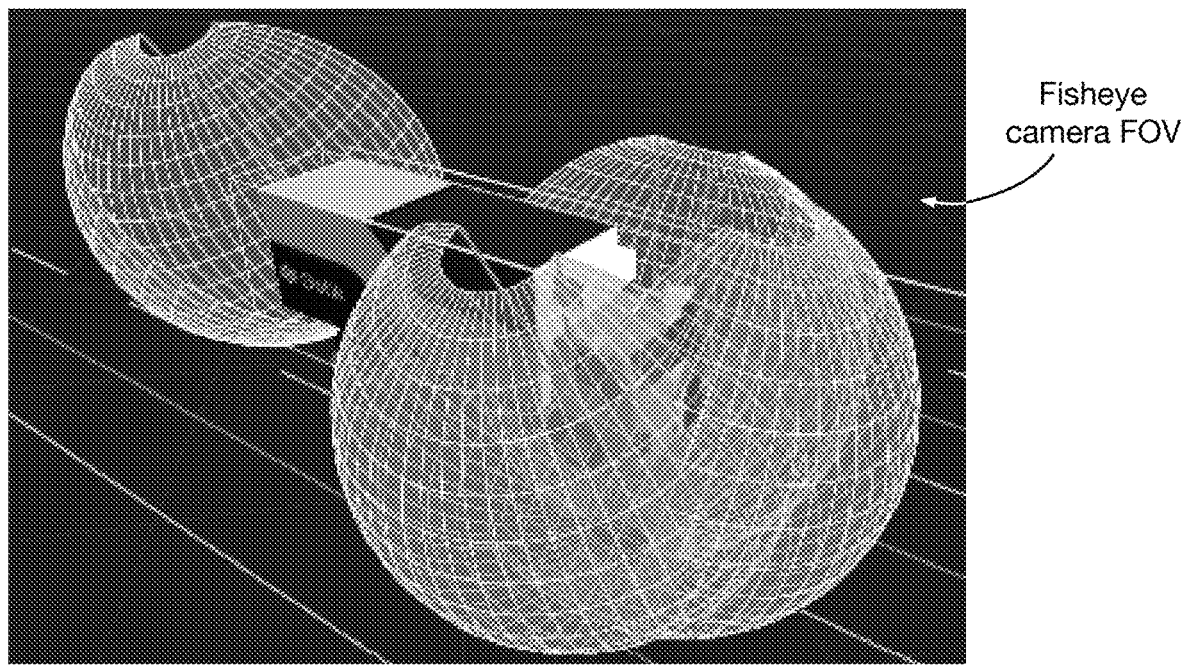
FIG. 4 is an illustrative example of a variant of a side-mounted fisheye camera field of view (FOV).
Figure 5A:
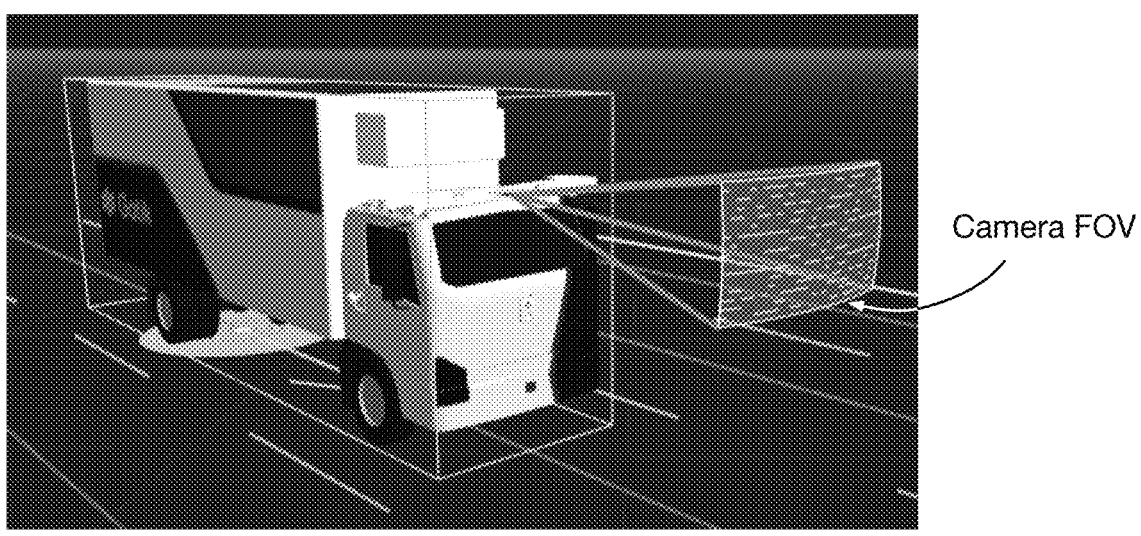
FIGS. 5A-5C are illustrative examples of a variant of roof-mounted forward-facing camera FOVs.
Figure 5B:
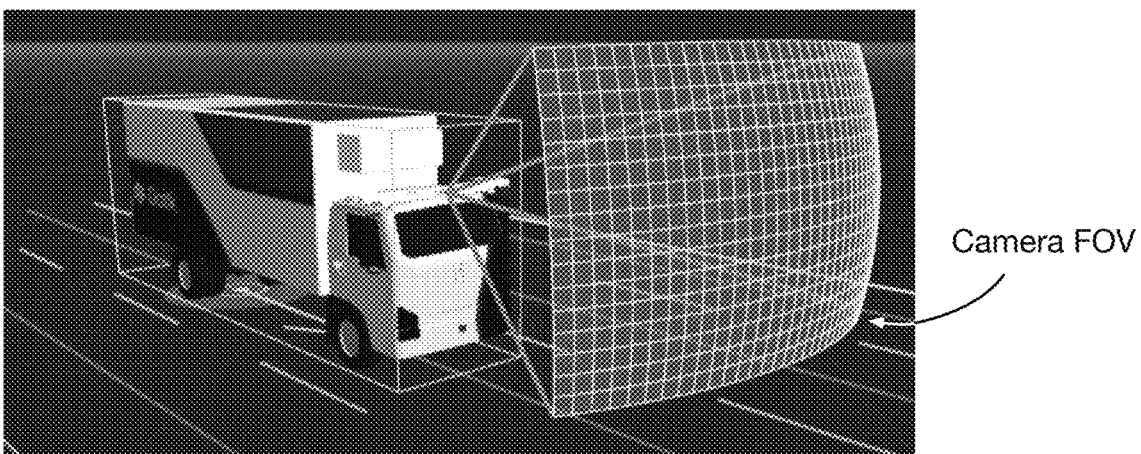
Figure 5C:
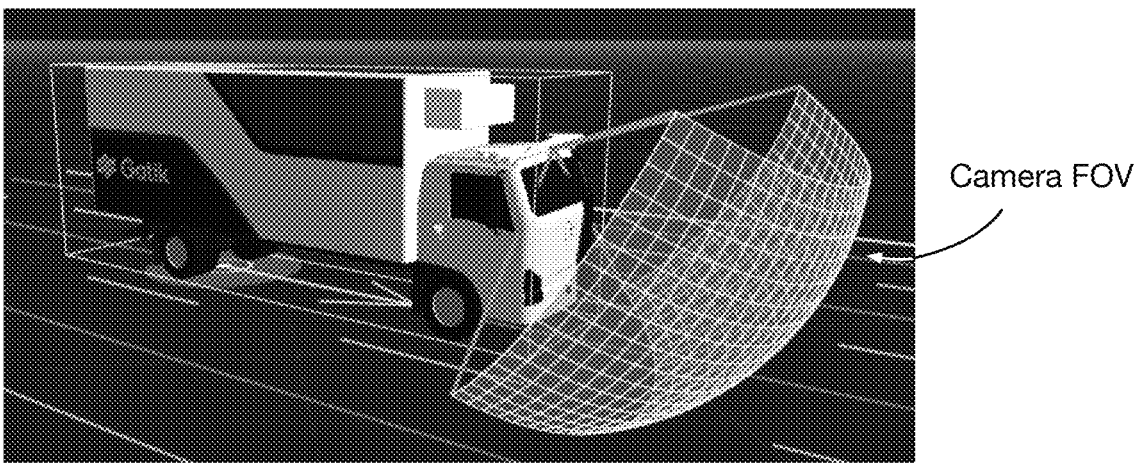
Figure 6A:
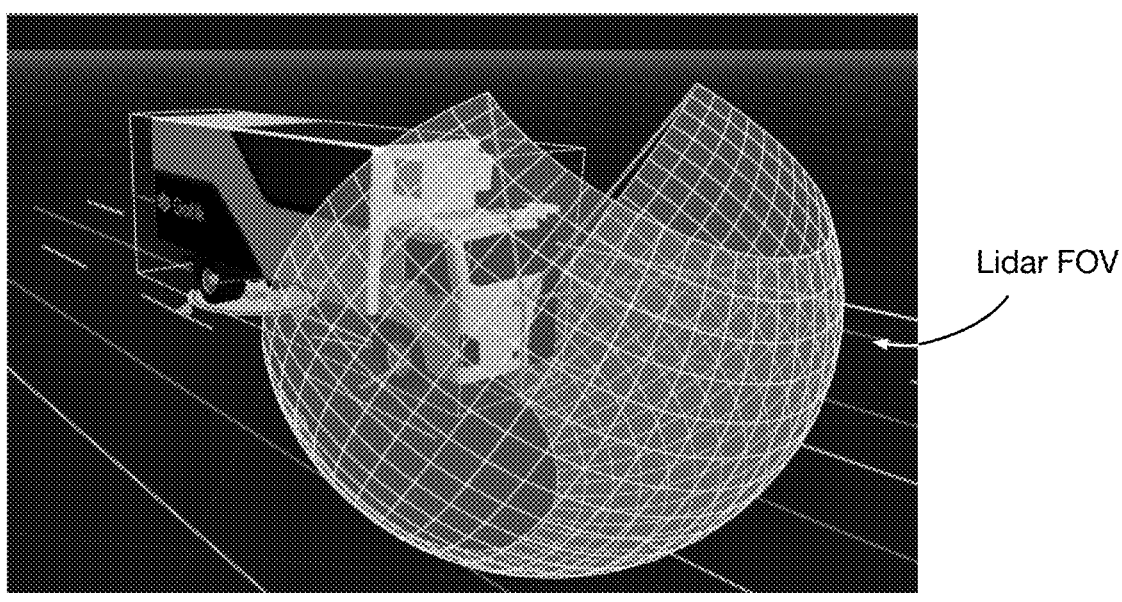
FIGS. 6A-6B are illustrative examples of a variant of side-mounted lidar FOVs.
Figure 6B:
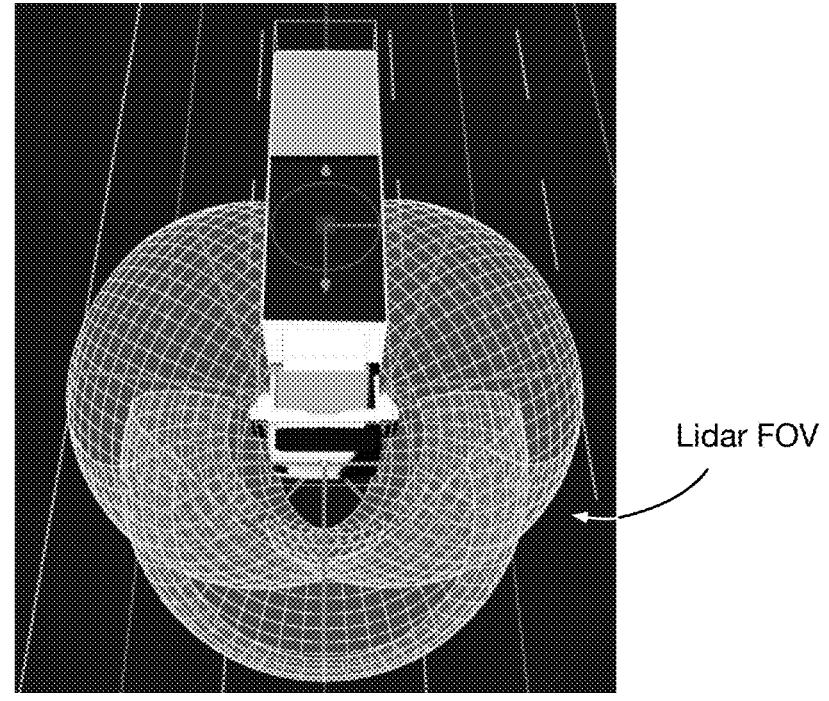
Figure 7A:
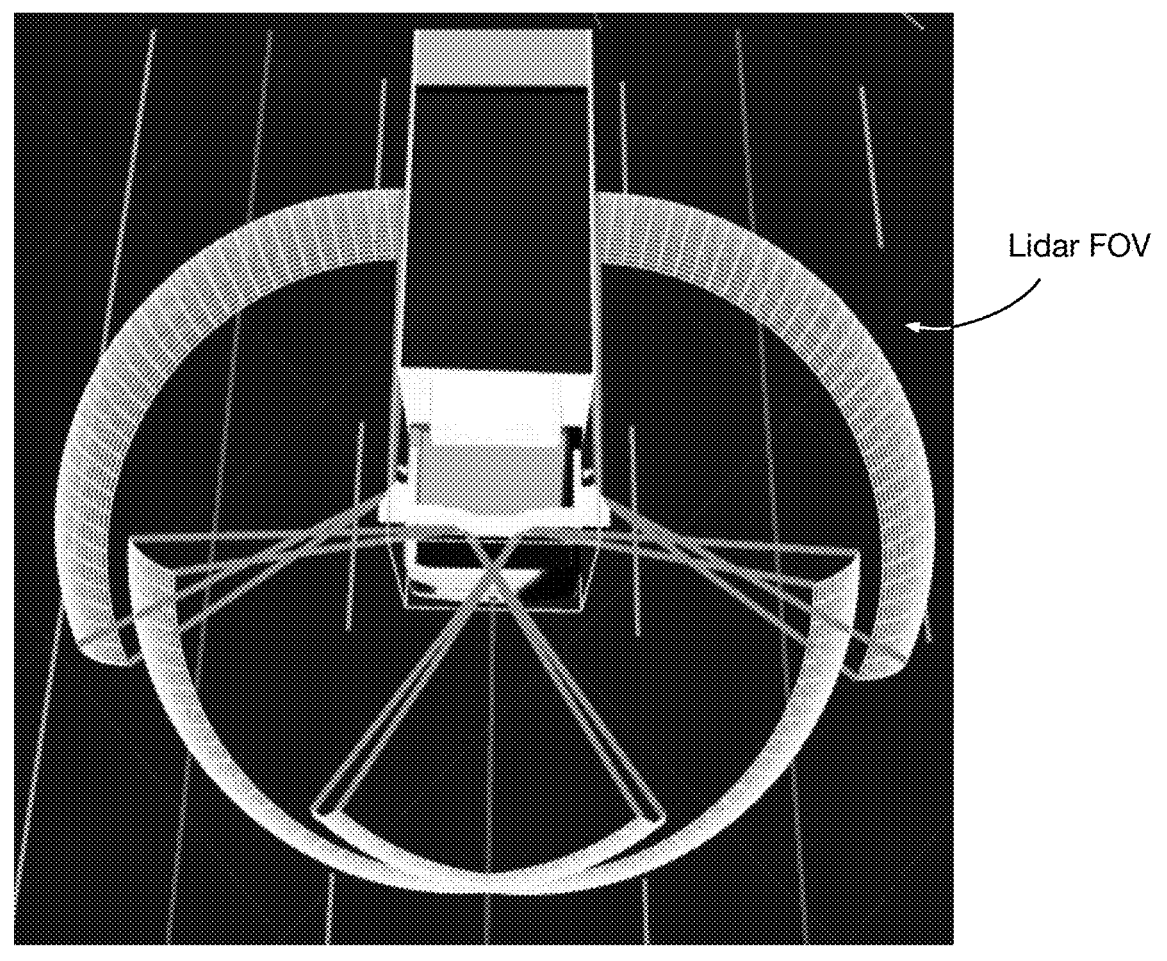
FIGS. 7A-B are illustrative examples of a variant of roof mounted long-range lidar FOVs.
Figure 7B:
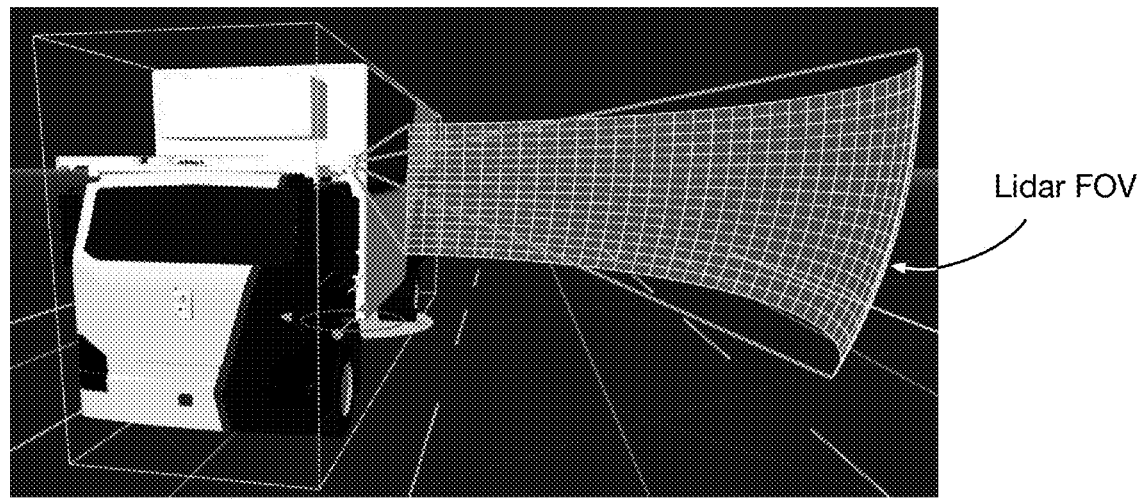
Figure 8A:
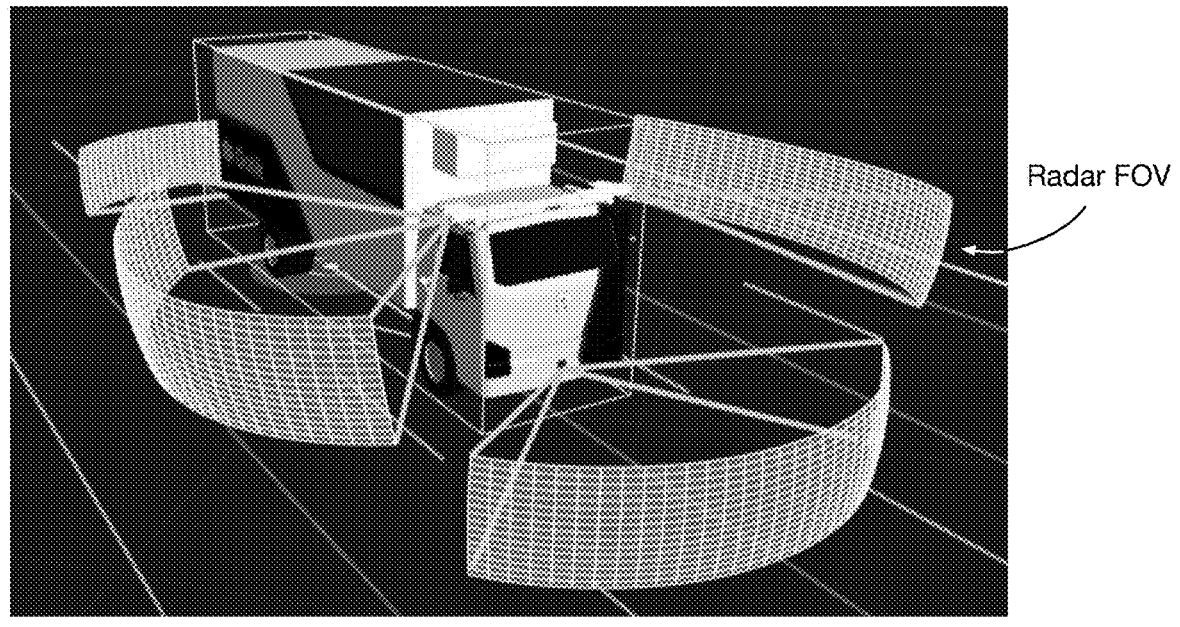
FIGS. 8A-8B are illustrative examples of variants of radar FOVs.
Figure 8B:
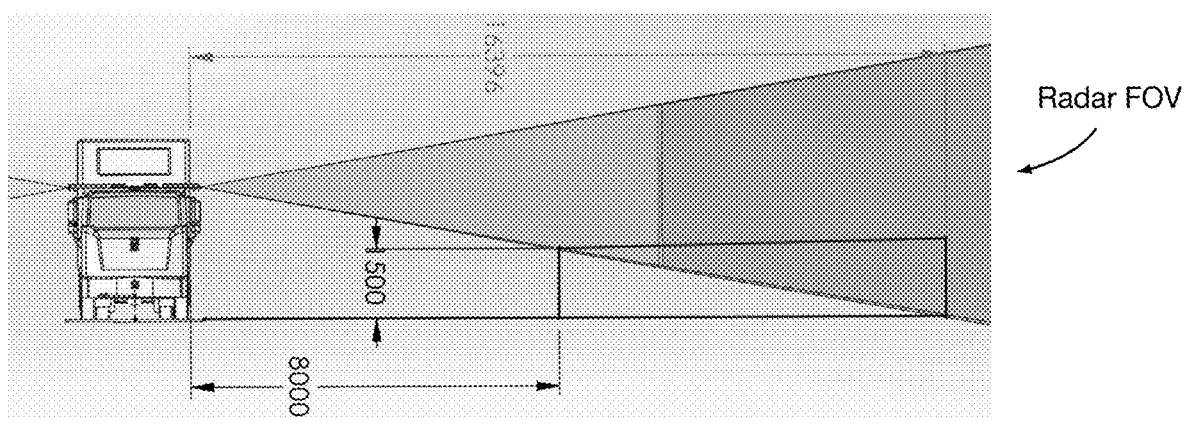
Figure 9A:
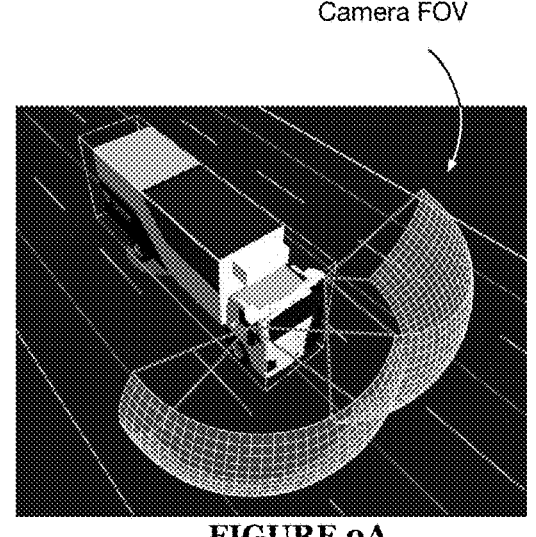
FIGS. 9A-9C are illustrative examples of a variant of roof-mounted camera FOVs.
Figure 9A:
Figure 9B:
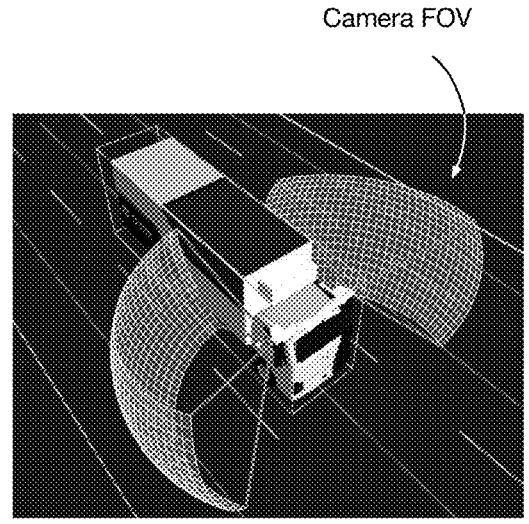
Figure 9C:
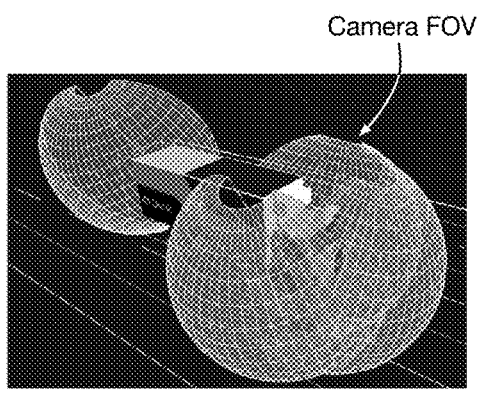
Figure 10:
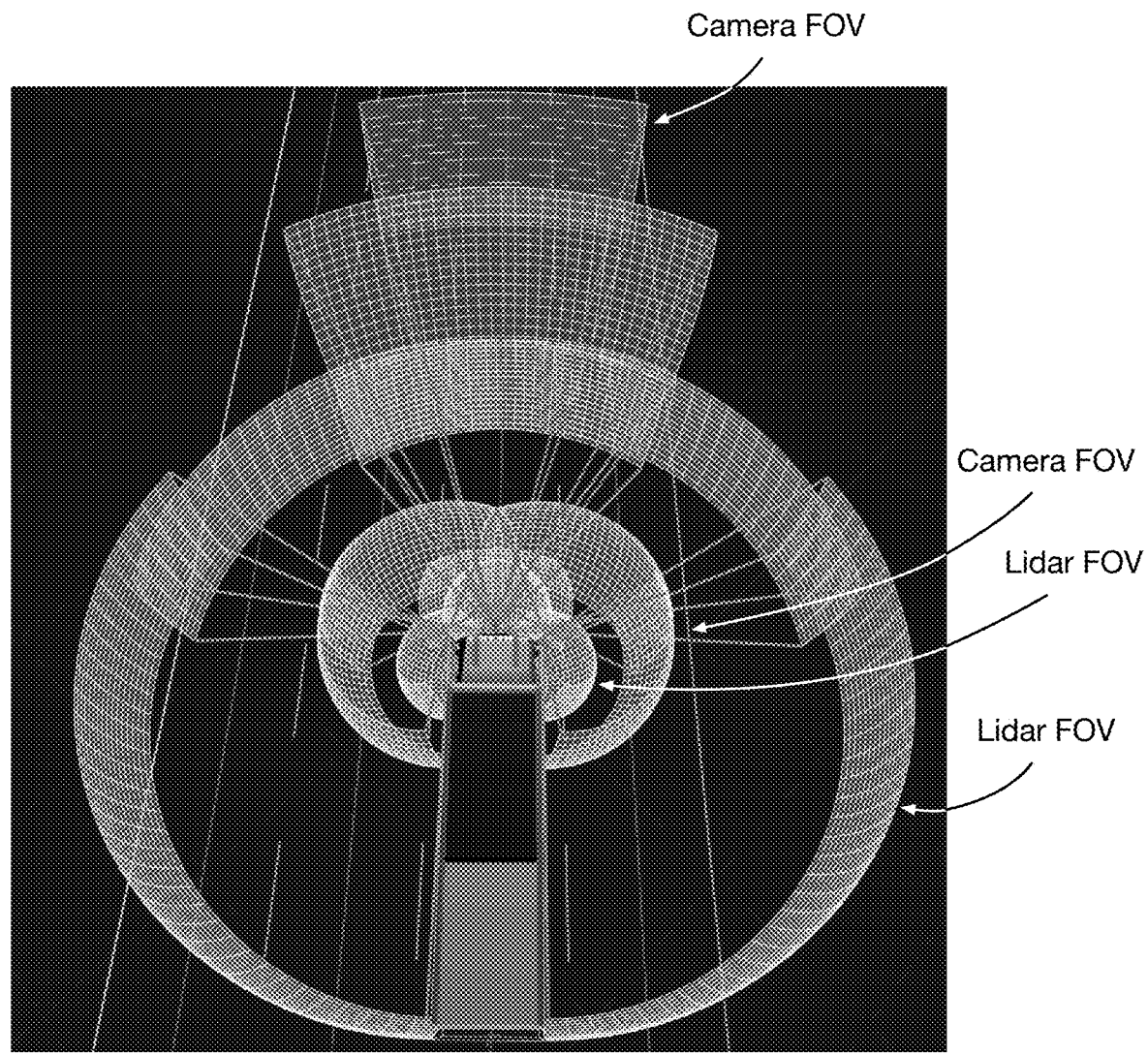
FIG. 10 is an illustrative example of different sensor modality FOVs.

The set of sensors 240 can be arranged in various configurations. Specific examples of the sensor arrangements are shown in FIGS. 3A-3C. Specific examples of the overlap in coverage are shown in FIG. 4, FIGS. 5A-5C, FIGS. 6A-6B, FIGS. 7A-7B, FIGS. 8A-8B, FIGS. 9A-9C, and FIG. 10, and FIGS. 22A-22B. The fields of view (FOVs) indicated in the aforementioned figures and/or any other figures do not necessarily represent limitations on the range of the cameras in variants of the system.

Figure 12:
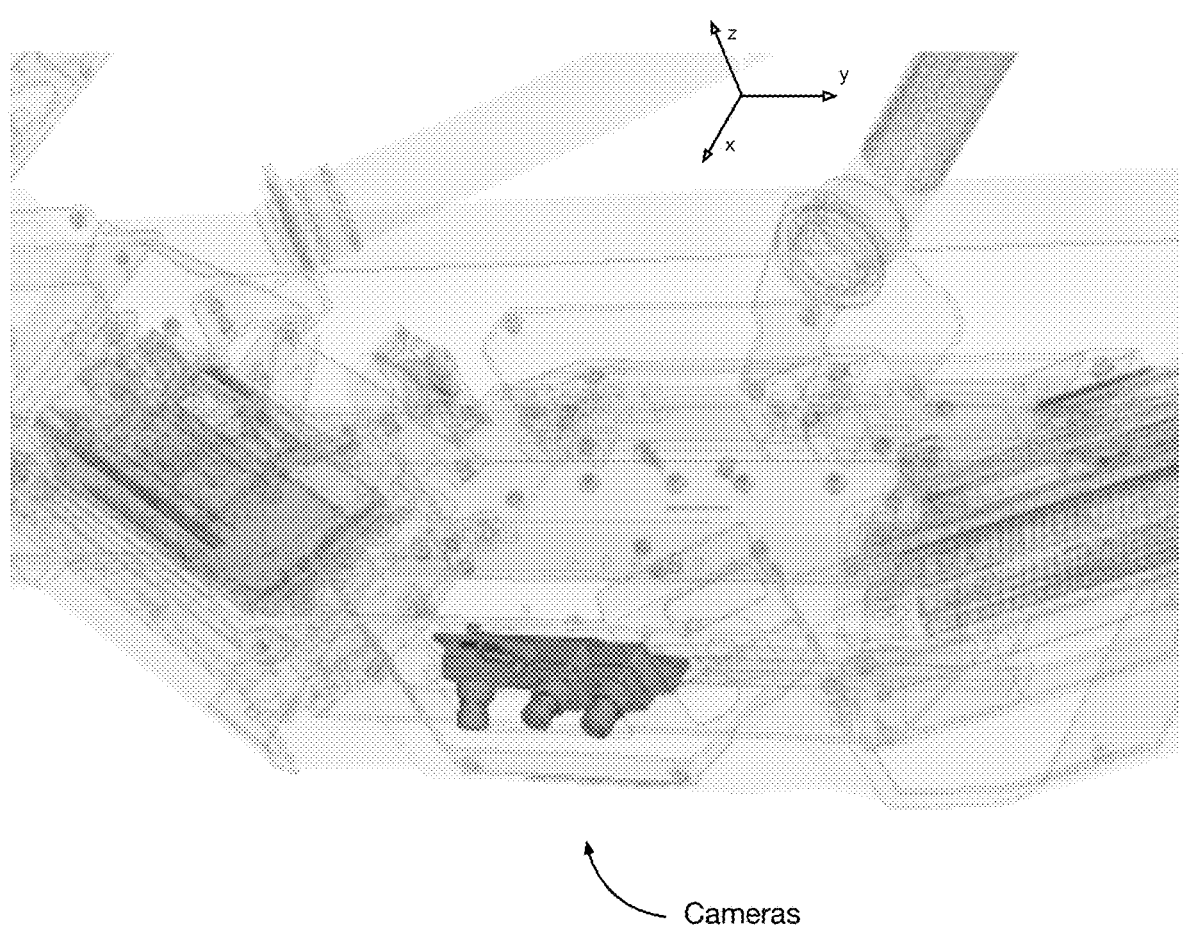
FIG. 12 is a view of a variant of forward-facing cameras.

In a first example, the set of sensors 240 can include three sensors (e.g., cameras) of a same type directly mounted to a dimensional layer and/or structural layer, each of the three sensors optionally having a different field of view and/or different elevation angle. An example is shown in FIG. 12. The minimum elevation angle can be substantially −68.8°, −21.5°, −8.5°, and/or any other suitable angle. The maximum elevation angle can be substantially −3.2°, 11.5°, 8.5°, and/or any other suitable angle. The sensors can overlap 50%, 70%, 90%, 100%, and/or any other suitable percentage. The pitch can be substantially −36°, −5°, 0°, and/or any other suitable angle. The horizontal range can be substantially 120°, 60°, 30°, and/or any other suitable range. The vertical range can be substantially 65.6°, 33°, 17°, and/or any other suitable range.

In a second example, the set of sensors 240 can include three sensors (e.g., spinning lidar sensors) each mounted to a different side sensor assembly at the front side, left side, and right side of the vehicle, respectively each spinning sensor pitched down, the three sensors cooperatively observing a region spanning in front of the vehicle, on both sides of the vehicle, and optionally behind the vehicle. The downwards pitch can be substantially 32°, substantially 37.4°, and/or any other suitable pitch, and can be different between the sensors. The yaw can be substantially 0°, substantially between positive or negative 80° and 100° (e.g., 90°), and/or any other suitable yaw. The vertical range can be substantially 105.2° (e.g., off-nadir angle of substantially 0°, 1°, 2°, etc.), and/or any other suitable range. The horizontal range can be substantially 360° (spinning sensors), alternatively substantially 200° (selectively capturing data), and/or any other suitable horizontal range. The maximum range can be substantially 50 m. The sensors can overlap 1, 10%, 30%, 50%, and/or any other suitable percentage.

In a third example, the set of sensors 240 can include four sensors (e.g., fixed FOV lidar sensors, etc.) of a same type arranged on a pair of dimensional layers (e.g., two sensors on each layer), wherein the four sensors cooperatively observe a region spanning in front of the vehicle, behind the vehicle, and on both sides of the vehicle. In this example, the area directly behind the vehicle can not be observed by sensors. The minimum elevation angle can be substantially −13°, and/or any other suitable angle. The maximum elevation angle can be substantially 13°, and/or any other suitable angle. The yaw can be substantially between positive or negative 10° and 40° (e.g., substantially 25°), substantially between positive or negative 110° and 130° (e.g., substantially) 120°, and/or any other suitable yaw. The pitch can be substantially 0°, −5°, and/or any other suitable pitch. The horizontal range can be substantially 120°, and/or any other suitable range. The cooperative horizontal range can be substantially 360°, substantially 359°, substantially 355°, and/or any other suitable range. The principal axis can be non-horizontal (e.g., −5° from horizontal axis, etc.). The sensors can overlap (e.g., azimuthally, etc.) 1, 10%, 30%, 50%, and/or any other suitable percentage. The maximum range can be substantially 200 m, and/or any other suitable range.

In a fourth example, the set of sensors 240 can include four sensors (e.g., radars; example shown in FIG. 8A and FIG. 8B) of a same type mounting in different locations (roof sensor assembly, side sensor assemblies on front side and rear side of vehicle, etc.), at different heights (e.g., two laterally-aligned roof sensors higher than two longitudinally-aligned side sensors). The minimum elevation angle can be substantially −10°, −20°, and/or any other suitable angle. The maximum elevation angle can be substantially 10°, 0°, and/or any other suitable angle. The pitch can be substantially 0°, −10°, and/or any other suitable angle. The sensors can capture measurements within asymmetric range (e.g., 8° up, 12° down). The yaw can be substantially positive or negative 90°, 0°, 180°, and/or any other suitable angle. The horizontal range can be substantially 100°, and/or any other suitable range. The vertical range can be substantially 20°, and/or any other suitable range. The range can be substantially 240 m and/or any other suitable range. The sensors can overlap 1, 10%, 30%, 50%, and/or any other suitable percentage.

In a fifth example, the set of sensors 240 can include four sensors (e.g., cameras) of a same type arranged on a pair of dimensional layers (e.g., two sensors on each layer), wherein the four sensors cooperatively observe a region spanning in front of the vehicle, behind the vehicle, and on both sides of the vehicle. In this example, the area directly behind the vehicle can not be observed by sensors. The minimum elevation angle can be substantially −45.8°, and/or any other suitable angle. The maximum elevation angle can be substantially 19.8°, and/or any other suitable angle. The horizontal range can be substantially 120°, and/or any other suitable range. The cooperative horizontal range can be substantially 360°, substantially 359°, substantially 355°, and/or any other suitable range. The sensors can overlap 10%, 30%, 50%, and/or any other suitable percentage. The vertical range can be substantially 65.6°, and/or any other suitable range. The sensors can be pitched down substantially 13 degrees. The yaw can be substantially between positive or negative 20° and 45° (e.g., 30°), substantially between positive or negative 110° and 130° (e.g., 120°), and/or any other suitable yaw. Sensors on the same lateral side can be substantially 3 in, 5 in, 7 in, 9 in, and/or any other suitable distance away from each other and 90 in, 94 in, 96 in, 98 in, 100 in, 102 in, 104 in from sensors on the opposite lateral side.

In a sixth example, the set of sensors 240 can include four sensors (e.g., fisheye cameras) of a same type arranged on a left side sensor assembly, a front side sensor assembly, a rear side sensor assembly, and a right side sensor assembly cooperatively observing an area spanning in front of, behind, and on both sides of the vehicle. The minimum elevation angle can be substantially −102°, and/or any other suitable angle. The maximum elevation angle can be substantially 52°, and/or any other suitable angle. The horizontal range can be substantially 196°, and/or any other suitable range. The vertical range can be substantially 154°, and/or any other suitable range. The cooperative horizontal range can be substantially 360°, 359°, 355°, and/or any other suitable range. The sensors can overlap 10%, 30%, 50%, and/or any other suitable percentage. The pitch of each camera can be substantially −25°, and/or any other suitable pitch. The sensors can be pitched down substantially 19.6°, and/or any other suitable angle. The yaw can be positive or negative 90°, 0°, 180°. The height from ground can be 2 ft, 3 ft, 4 ft, and/or any other suitable height.

In a variant of the sixth example, the sensor can be integrated with the roof assembly (e.g., in the lateral middle of the roof sensor array) instead of in the front side sensor assembly. In a specific example, the camera subassembly can include a left, right, and front fisheye camera (e.g., 196° lateral×154° vertical FOV) mounted to a left, right, and roof sensor assembly (e.g., in the middle of the roof sensor assembly) respectively, each pitched between 0° and 90° downward, with the respective FOVs laterally overlapping by more than 1% and less than 30%, which can be used for GRS and/or object detection. The front fisheye camera can be arranged in the middle of the roof sensor array.

In a seventh example, the set of sensors 240 can include two location sensors (e.g., GNSS antenna) and a GNSS IMU. GNSS antennae can be mounted to a top surface of the roof sensor assembly at laterally-symmetrical distance from the vehicle longitudinal axis. GNSS IMU can be along the longitudinal axis (and/or sagittal plane) of the vehicle, mounted to the roof assembly, roof, or within vehicle cab, and/or any other suitable location. In a specific example, a location is estimated based on aggregating GNSS data from each antenna and the GNSS IMU.

Figure 22A:
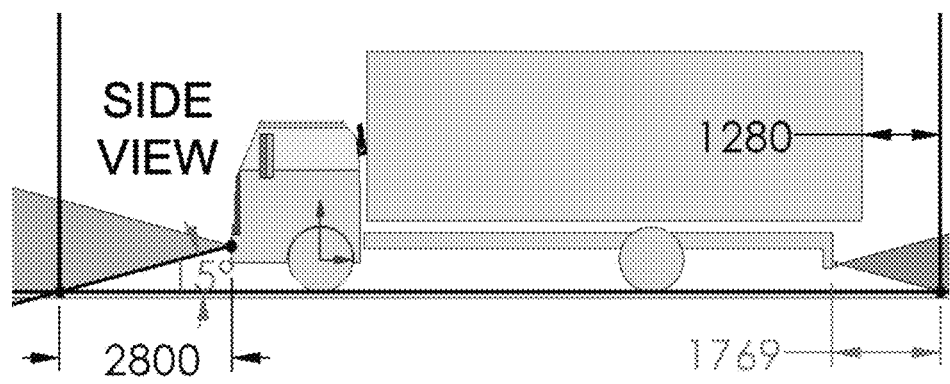
FIGS. 22A-22B are views of a variant of radars.
Figure 22B:
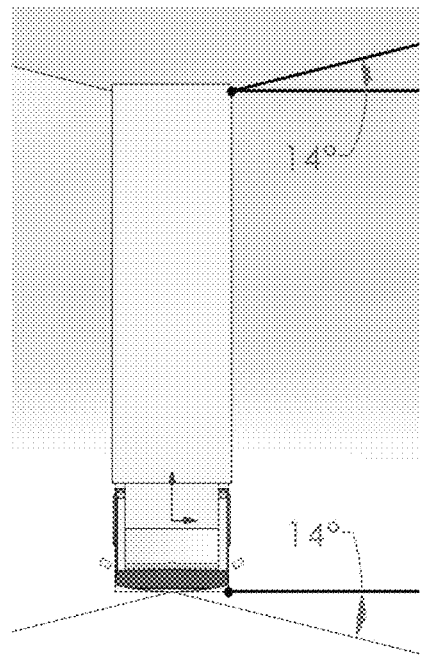

In an eighth example, the set of sensors 240 can include front and/or back sensors (e.g., radar sensors, etc.), which can be mounted on the front and back bumper (e.g., bumper sensors), respectively (e.g., examples shown in FIG. 22A and FIG. 22B). In this example, the sensors can be mounted at the center of each bumper (e.g., along a longitudinal mid-line of the vehicle), at a corner of each bumper, on the rear gate, at the top of the frame, and/or at any other suitable point or set of points. In this example, the maximum elevation angle can be −20°, −10°, 0°, 10°, within a range bounded by the aforementioned values, and/or within any other suitable range. In this example, the minimum elevation angle can be −10°, 0°, 10°, 20°, 30°, within a range bounded by the aforementioned values, and/or within any other suitable range. In this example, the sensors can be pitched down 0°, 10°, 20°, 30°, 45°, 60°, and/or any other suitable pitch. In this example, the sensors can have a yaw of substantially 180°.

In a specific example, the perception sensors can be limited to a combination of cameras (e.g., fisheye, wide angle, etc.), fixed lidar, and radar. Alternatively, the set of sensors can include other sensors and/or a different combination of sensors.

However, the set of sensors 240 may be otherwise configured.

Figure 13A:
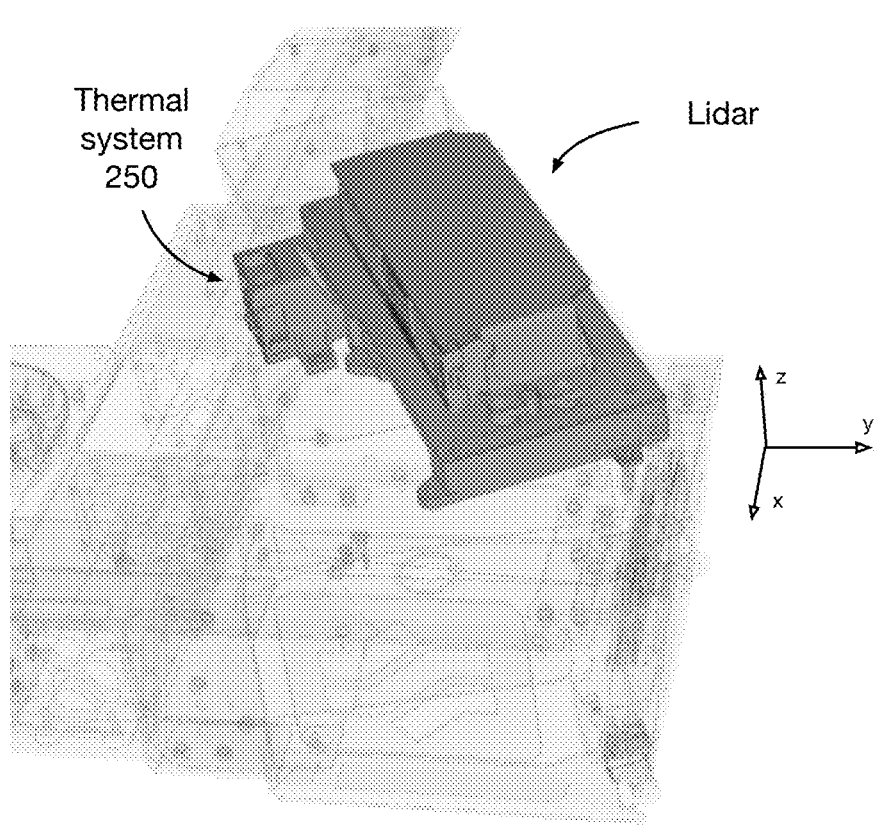
FIGS. 13A-13B are views of a variant of long-range lidars.
Figure 13B:
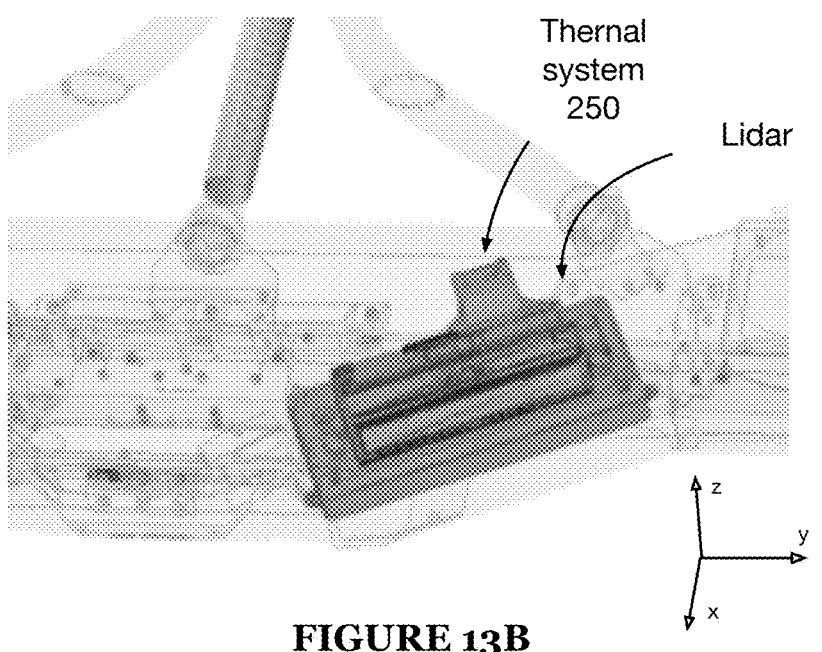

The system can optionally include a thermal system 250, which functions to control temperature of system components. The thermal system 250 can control the temperature of a target component, wherein the target component can be a component which is heated or cooled by the thermal system 250. The target component can include: a lidar sensor (e.g., example shown in FIGS. 13A and 13B), GPS sensor, cameras, processing system, and/or any other suitable system components. The thermal system 250 can keep a target component within a desired temperature range, keep the target component below a threshold value, limit a rate of temperature change, keep the target component at a temperature of another system component, and/or can alternatively provide any other suitable temperature control functionality.

The thermal system 250 can be mounted directly to target component, to structural layer, dimensional layer, and/or any other suitable system component. The thermal system 250 is preferably directly thermally connected to target component, but can alternatively be indirectly connected to target component. The thermal system 250 can include a temperature control mechanism. In examples, the temperature control mechanism can be used as a heatsink or as a heat conductor to the vehicle body (e.g., wherein the vehicle body functions as a heatsink). The thermal system 250 preferably expels heat from the system via a radiator (e.g., through which coolant liquid flows), but can alternatively expel heat through any other suitable mechanism. The thermal system 250 can leverage thermoelectric cooling, liquid cooling, forced air cooling, compressed air cooling, micro heat pump, and/or any other suitable cooling system types. The thermal system 250 is preferably convective, but can alternatively be conductive, radiative, and/or any other suitable thermal transfer type.

The thermal system 250 is preferably redundant (e.g., includes two loops, two pumps, etc.) and fluidly connected to two processing systems, respectively. In an example, when one pump fails, a set of valves can redirect flow into the other loop driven by the other pump. However, the thermal system 250 can include a single loop or be otherwise constructed.

Figure 17:
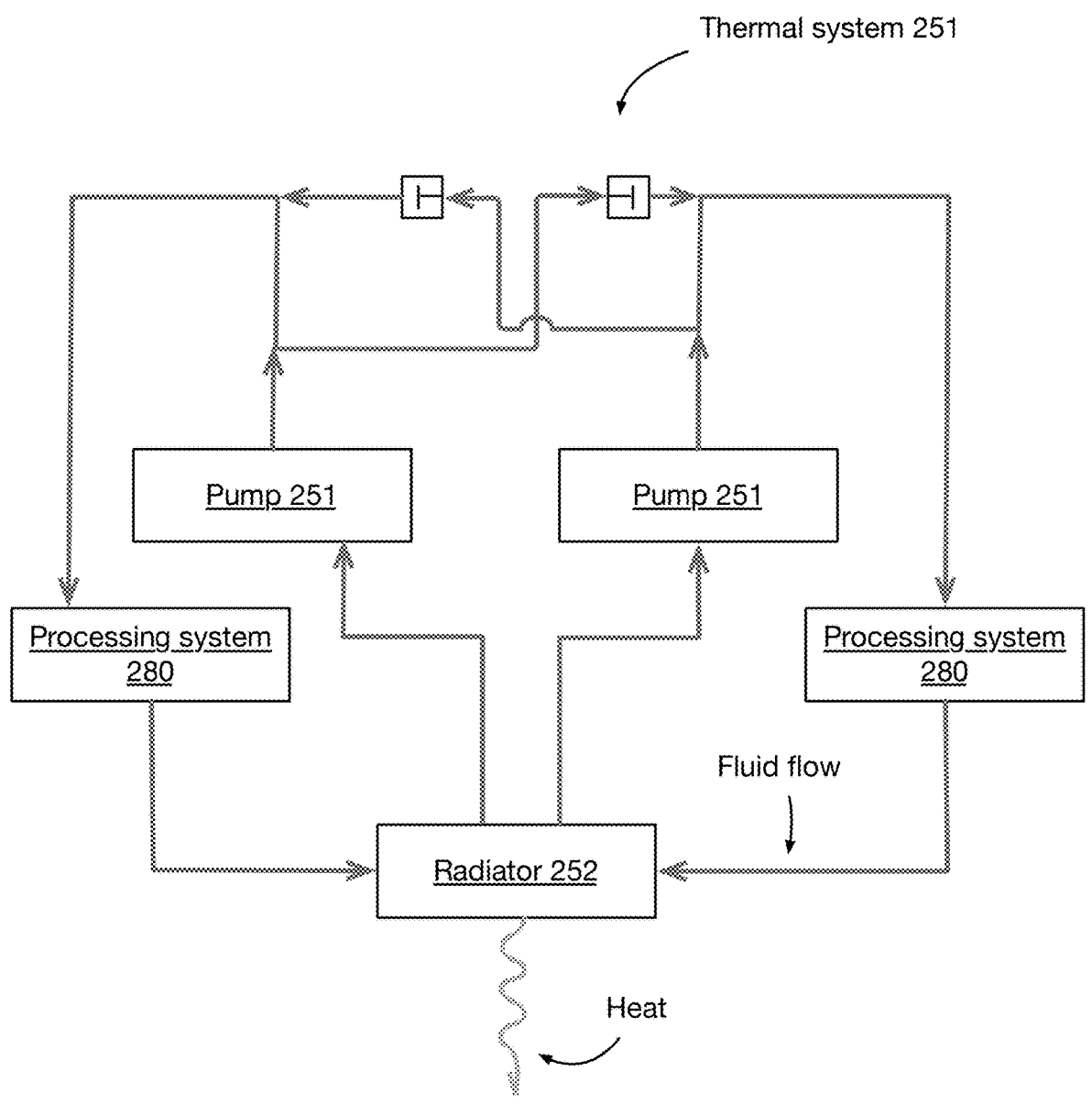
FIG. 17 is a schematic representation of a variant of a redundant cooling system.

The thermal system 250 can include various components and configurations. In a specific example (e.g., as shown in FIG. 17), the thermal system 250 can include a liquid-cooling system. The liquid flow for the liquid-cooling system is preferably driven by a set (e.g., pair) of pumps 251, but can alternatively be driven by any other suitable mechanism. The thermal system 250 preferably includes a heat expulsion mechanism 252 (e.g., a heat exchanger, a radiator, etc.) for expelling heat, but can alternatively not include a heat expulsion mechanism.

In examples, the sensors (e.g., lidar, camera, radar, etc.) can be thermally connected to the structural layer (e.g., via a direct thermal connection, via the dimensional layer, etc.), wherein the structural layer can function as a heatsink for the sensors.

However, the thermal system 250 may be otherwise configured.

The system can optionally include a set of clearance lights 260, which function to inform other environmental agents (e.g., drivers, autonomous vehicles, etc.) of the truck component height. The clearance lights 260 can be integrated into sensor assembly (e.g., roof sensor assembly when the roof sensor assembly increases the effective height of the truck and/or truck cab and/or in any other system component). The clearance lights 260 can be mounted beneath the sensor assembly, above the sensor assembly, and/or any other suitable location. The clearance lights 260 can be mounted to the structural layer, dimensional layer, housing around the structural and/or dimensional layers, and/or any other suitable mounting surface. The sensor assembly and/or components thereof can include a set of clearance light mounts to which clearance lights can be attached. In a first example, the clearance lights 260 can be mounted on the top surface of the sensor assembly. In a second example, the clearance lights 260 can be mounted on the bottom surface of the sensor assembly. In a third example, the clearance lights 260 can be mounted at laterally maximal locations on the sensor assembly. In a fourth example, the clearance lights 260 can be mounted on the front surface of the sensor assembly. In a specific example, the clearance lights 260 can be arranged in a lateral row on the top surface of the roof sensor assembly, wherein each clearance light is individually controlled by a BCM. The clearance lights 260 can be communicatively and/or electrically connected to a vehicle body control module (BCM), which can control illumination of the clearance lights 260. The clearance lights 260 can alternatively be communicatively and/or electrically connected to the processing system 280. In an example, the connection can be a wired connection through an AV roof.

However, the clearance lights 260 may be otherwise configured.

The system can optionally include a communication system 270, which functions to communicate information about the vehicle and/or sensor assembly to a remote entity. The communication system 270 can be mounted to the structural layer, dimensional layer, and/or any other suitable system component. The communication system 270 can include a pair of communication systems, but can alternatively include one communication system and/or any other suitable number of communication systems. The communication system 270 can be mounted to a structural layer, dimensional layer, housing, or other mounting point.

In a specific example, a pair of communication systems 270 can be mounted to a top surface of a roof assembly, wherein each communication system 270 of the pair can be positioned between two fixed FOV lidar sensors. Each communication system 270 in the pair can be positioned at the same lateral distance from a truck longitudinal axis.

The communication system 270 can provide cellular (4G, 5G, etc.) communications, short-range wireless communication (e.g., Bluetooth, zigbee, IR, etc.), Satellite communications, vehicle-to-everything (V2X) communications, Dedicated Short Range Communications (DSRC), Wifi, LTE, and/or any other suitable communication types.

The communication system 270 can include an antenna, transmitter, receiver, and/or any other suitable communication components. The communication system 270 can be communicatively connected to the Electronic Control Unit, Body Control Module, Vehicle Control Unit, and/or any other suitable vehicle systems. The communication system 270 and/or components thereof can be mounted to the dimensional layer, structural layer, sensors, and/or any other suitable system component.

However, the communication system 270 may be otherwise configured.

The processing system 280 functions to interpret perception data from the set of sensors. The processing system 280 can be within the cab, but can alternatively be mounted to the structural layer, dimensional layer, and/or any other suitable system component. The processing system 280 preferably includes two processing systems per sensor assembly (e.g., for roof), but can alternatively include one processing system per sensor assembly, or alternatively o processing systems per sensor assembly (e.g., for side sensor assembly).

Figure 18:
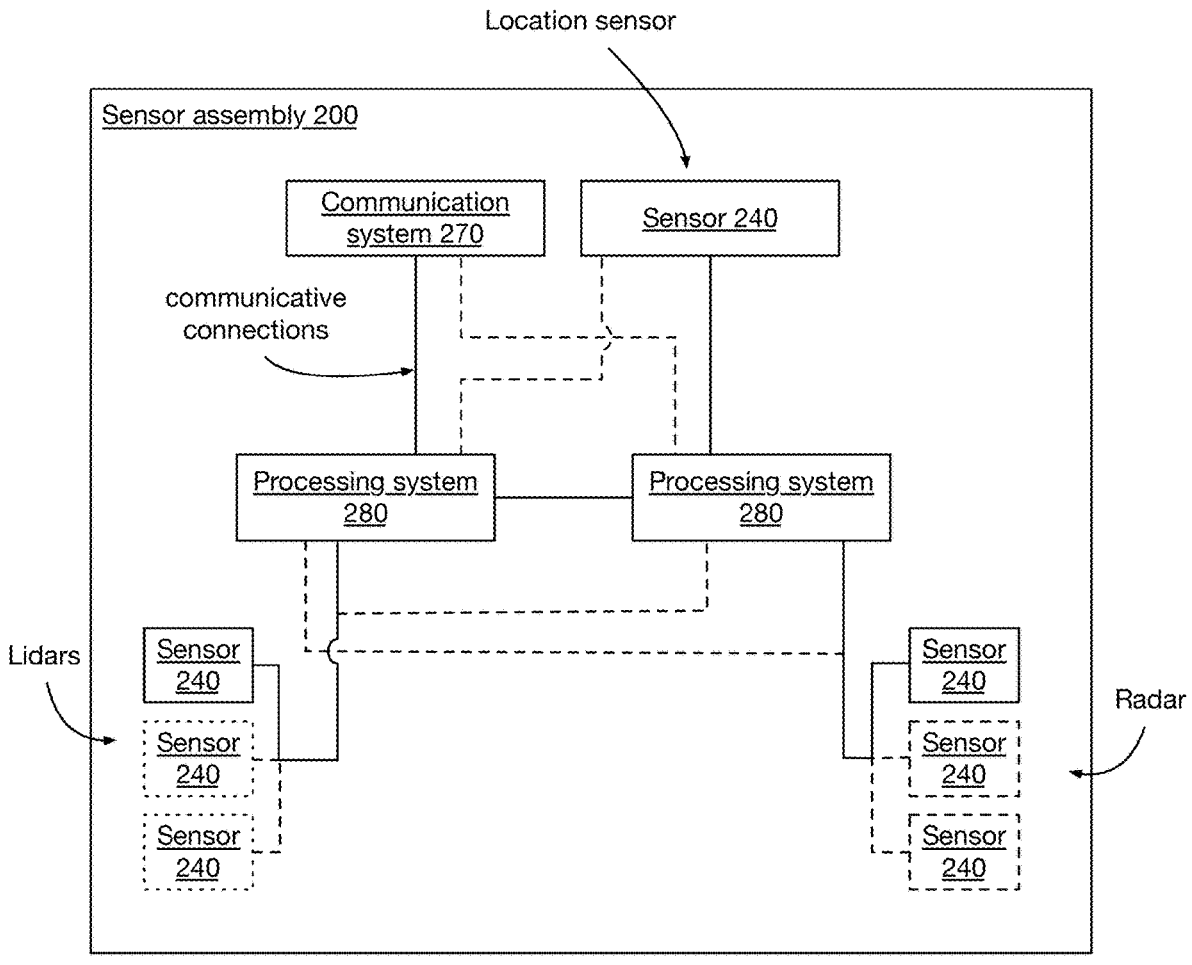
FIG. 18 is a schematic representation of a variant of redundant processing systems.

In variants with two processing systems, each processing system can perform redundant perception operations on the sensor data (e.g., example shown in FIG. 18), or alternatively one processing system can be a backup for the other, and/or any other suitable configuration. The redundant operations can include feature identification, classification, decision-making, calibration, odometry, and/or any other suitable operations.

The processing system 280 can optionally be thermally connected to (e.g., cooled by) the thermal system and/or any other suitable system. The processing system 280 can be communicatively connected to the set of sensors. The processing system 280 can be communicatively connected to the sensors via the other processing system, but can alternatively be directly communicatively connected to the sensors and/or any other suitable connection configuration. The processing system 280 can perform sensor calibration and/or any other suitable processing functions. The processing system 280 can include CPU, GPU, multi-processor systems, single processor systems, cloud computer, and/or any other suitable processing systems.

However, the processing system 280 may be otherwise configured.

The system can optionally include an actuating connector 290 functions to actuate the roof assembly between a narrow mode and a wide mode. The actuating connector 290 can facilitate relative motion between two different components. In a first example, the different components can include a dimensional layer and structural layer. In a second example, the different components can include a sensor and dimensional layer. In a third example, the different components can include a sensor and structural layer. In a fourth example, the different components can include dimensional layers connected to each other. In a fifth example, the different components can include a structural layer subsection connected to another structural layer subsection. In variants, the actuating connector 290 can facilitate mounting of a roof sensor assembly to cabs of different types (e.g., requiring different lateral widths between mounts) and/or any other suitable mounting configurations. The actuating connector 290 can include: a hinge, slide (linear, dovetail, drawer, telescoping rails, etc.), linear slider, curved slider, rail, tracks, ball joint, flexible linkage, scissor mechanism, parallel linkage, and/or any other suitable connecting mechanism. The actuating connector 290 can be passively controlled, manually controlled, automatically controlled (e.g., via commands from processing system, etc.), actively controlled, and/or otherwise controlled.

In variants, the actuating connector 290 can include an actuator (e.g., providing active control). The actuator can include: a solenoid, motor (servo motor, stepper motor, linear actuator, etc.) with gearing, linear actuator, electromagnet, pneumatic cylinder, and/or any other suitable actuator type.

The actuating connector 290 can actuate subsections of the structural layer relative to each other (e.g., a left and right side, etc.), can alternatively actuate the structural layer relative to the dimensional layer, and/or actuate any other suitable portion of the system relative to each other.

In variants, the actuating connector 290 can include a locking mechanism which can transition the actuating connector between a locked mode and an unlocked mode. The locked mode can function to constrain lateral actuation (e.g., in which the connector constrains lateral actuation). The unlocked mode can function to enable lateral movement (e.g., in which the actuating connector facilitates lateral actuation).

Figures 20A, 20B, 20C:
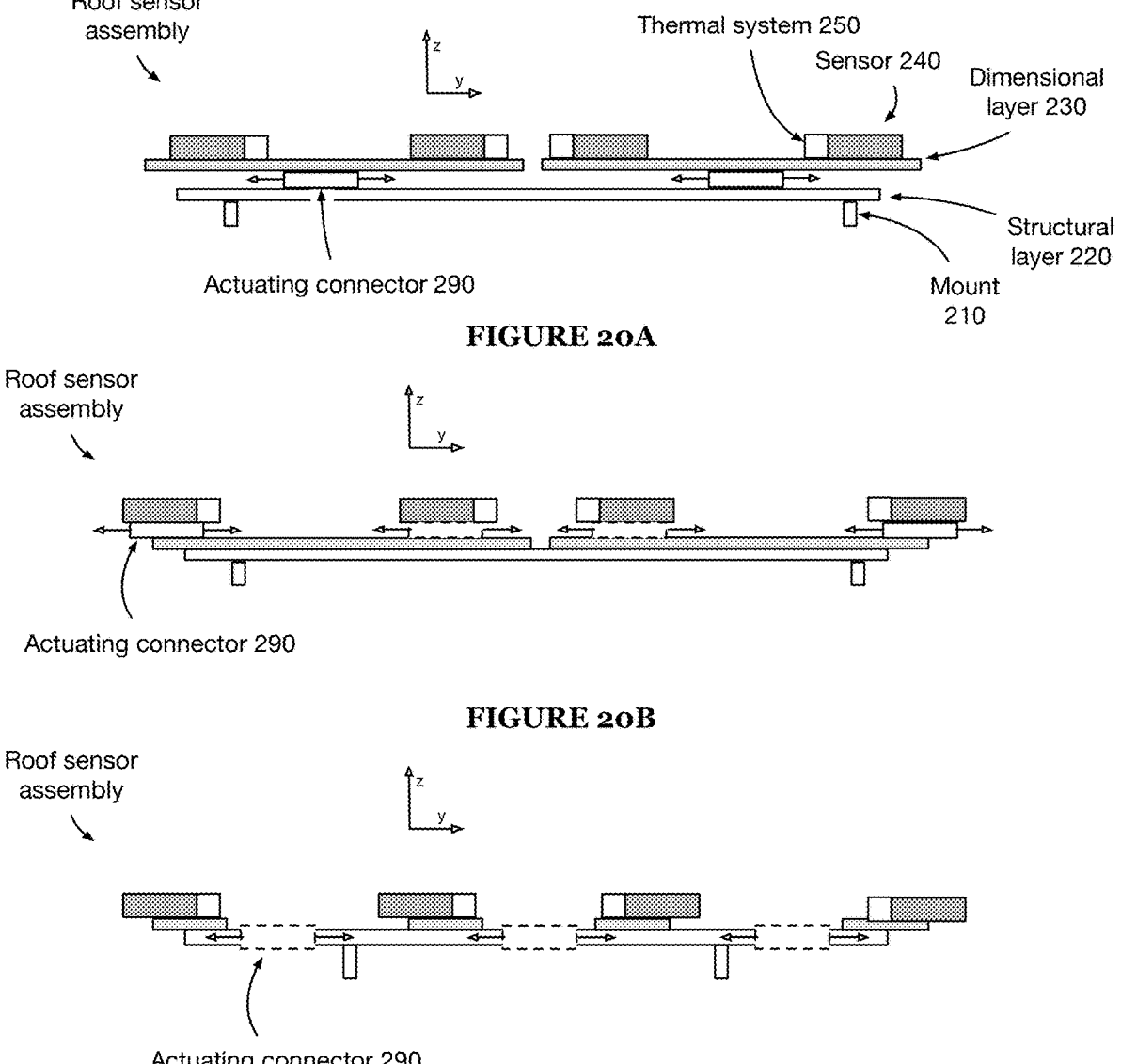
FIGS. 20A-20C are illustrative examples of variants of actuating connector positions.

The actuating connector 290 can enable the overall roof assembly (and/or component thereof) to increase in lateral width (e.g., examples shown in FIGS. 20A-20C). The lateral width increase can be 1%, 2%, 3%, 5%, 9%, 10%, 20%, within an open or closed range bounded by the aforementioned values, and/or any other suitable value. The width increase can alternatively be less than 1% or greater than 20%.

The actuating connector 290 can enable an expansion magnitude wherein the overall roof assembly (and/or component thereof) increases in lateral width by 0.25 in, 0.5 in, 1 in, 1.5 in, 2 in, 3 in, 4 in, 8 in, 12 in, 24 in, 48 in, within an open or closed range bounded by the aforementioned values, and/or any other suitable value.

In an example, the roof assembly maximum width in the wide mode is over substantially 101.5" and roof assembly maximum width in the narrow mode is under substantially 101.5".

The actuating connector 290 can connect different components to each other.

In an example, a laterally-oriented linear slide lock can connect two different components (e.g., two different components of the structural layer, a structural layer and a dimensional layer, etc.) to each other. The linear slide lock can facilitate lateral sliding motion between the two different components in an unlocked mode but can constrain lateral sliding motion between the two different components in the locked mode.

In a second example, the actuating connector 290 can include a hinge (e.g., with a vertical and/or longitudinal axis of rotation) connecting two different components (e.g., two portions of the structural layer, etc.). The actuating connector 290 can facilitate operation between a narrow mode wherein a laterally-distal component is close to the laterally-proximal component, and an wide mode wherein the laterally-distal component is farther from the laterally-proximal component.

However, the actuating connector 290 may be otherwise configured.

All references cited herein are incorporated by reference in their entirety, except to the extent that the incorporated material is inconsistent with the express disclosure herein, in which case the language in this disclosure controls.

As used herein, "substantially" or other words of approximation can be within a predetermined error threshold or tolerance of a metric, component, or other reference, include values within 0.1%, 1%, 2%, 5%, 10%, 20%, a tolerance threshold, or any other predetermined range of a target value, and/or be otherwise interpreted.

Optional elements, which can be included in some variants but not others, are indicated in broken line in the figures.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A system, comprising:

an autonomous vehicle defining a longitudinal axis and comprising a front axle and a cab defining a roof;

a roof assembly, comprising:

a frame extending across a roof width and defining a set of mounting features at different points along a width of the frame;

a set of mounts mounting the frame to the roof using a subset of the set of mounting features;

a pair of dimensional plates, each mounted to a left and right end of the frame, respectively;

a set of roof sensors comprising:

a first lidar sensor mounted to a first dimensional plate of the pair, the first lidar sensor comprising a first fixed field of view (FOV) encompassing a front region and side region of the vehicle and arranged with the first fixed FOV directed toward the front and rear of the vehicle;

a second lidar sensor mounted to the first dimensional plate, the second lidar sensor comprising a second fixed field of view overlapping the first fixed field of view and defining a non-horizontal principal axis;

a set of radar sensors directly mounted to outer lateral ends of the pair of dimensional plates and arranged with fields of view encompassing side regions of the cab; and a set of cameras directly mounted to the first dimensional plate; and a set of auxiliary sensors separate from the set of roof sensors, the set of auxiliary sensors fixed to a lateral side of the cab, the set of auxiliary sensors comprising a third lidar sensor comprising a third field of view with a minimum off-nadir angle less than 1 degree, wherein the set of roof sensors and the set of auxiliary sensors are extrinsically calibrated relative to the front axle, and wherein the set of roof sensors are extrinsically calibrated relative to a rear axle of the autonomous vehicle using an intermediate calibration of the set of roof sensors relative to the front axle.

2. The system of claim 1, wherein:

the first lidar sensor has a second principal axis at a first yaw angle between 115° and 120° from the longitudinal axis and is mounted proximal to the outer lateral end of the first dimensional plate; and the second lidar sensor has a first principal axis at a second yaw angle between 20° and 40° from the longitudinal axis and is mounted to the first dimensional plate laterally inwards relative to the first lidar sensor; and the third lidar sensor axis is longitudinally behind the first lidar sensor and second lidar sensor and has a third principal axis at a yaw angle between 95° and 115° from the longitudinal axis.

3. A system, comprising:

an autonomous vehicle comprising a roof, a front axle, and a rear axle;

a roof assembly, comprising:

a frame comprising a set of lidar mounts and a set of roof mounts;

a set of adjustable mounts directly connecting the set of roof mounts to the roof; and a set of roof sensors mounted to the frame, comprising:

a plurality of lidar sensors each mounted to a different lidar mount of the frame; and a set of cameras mounted to the frame; and a set of sensor side assemblies mounted to the autonomous vehicle, each comprising:

a housing fixed to a side of the autonomous vehicle; and a set of auxiliary sensors fixed to the housing, wherein the set of roof sensors and the set of auxiliary sensors are extrinsically calibrated relative to the rear axle based on a set of intermediate calibrations of the set of roof sensors and the set of auxiliary sensors with the front axle.

4. The system of claim 3, wherein the lidar sensors each comprise a fixed field of view (FoV).

5. The system of claim 4, wherein the fields of view of the lidar sensors overlap and cooperatively encompass a continuous region extending in front of and behind the vehicle.

6. The system of claim 5, wherein the continuous region encompasses subregions spanning at least 350° around a center of the vehicle.

7. The system of claim 3, wherein the frame comprises a dimensional plate, wherein at least one of the plurality of lidar sensors and at least one of the set of cameras are mounted directly to the dimensional plate.

8. The system of claim 3, wherein the autonomous vehicle is a class 6 or class 7 truck.

9. The system of claim 3, wherein the roof assembly further comprises a set of redundant processing systems communicatively connected to the set of roof sensors and the set of auxiliary sensors, the set of redundant processing systems configured to perform redundant perception operations on observations captured by the set of roof sensors and the set of auxiliary sensors.

10. The system of claim 9, wherein the roof assembly further comprises a wireless transmitter and wireless receiver mounted to the frame and communicatively connected to each of the set of redundant processing systems.

11. The system of claim 3, wherein the roof assembly further comprises a set of lights communicatively coupled to a body control module (BCM) of the autonomous vehicle.

12. A system for an autonomous vehicle, comprising:

a roof assembly, comprising:

a frame comprising a set of mounts mounting the frame to a roof of the autonomous vehicle;

a dimensional plate mounted to the frame;

a set of roof sensors, comprising:

a first lidar sensor directly mounted to the dimensional plate and oriented towards a rear end of the autonomous vehicle; and a second lidar sensor directly mounted to the dimensional plate and oriented towards a front end of the autonomous vehicle; and a processing system communicatively coupled to the first lidar sensor and configured to calibrate the first lidar sensor by:

determining a first extrinsic transform between the first lidar sensor and a front axle of the autonomous vehicle; and using the first extrinsic transform, determining a second extrinsic transform between the first lidar sensor and a rear axle of the autonomous vehicle.

13. The system of claim 12, wherein the first lidar sensor and second lidar sensor are fixed field of view (FoV) sensors.

14. The system of claim 13, wherein a field of view of the first lidar sensor and a field of view of the second lidar sensor overlap azimuthally by over 10%.

15. The system of claim 12, wherein the roof assembly further comprises:

a second dimensional plate mounted to the frame;

a third lidar sensor mounted to the second dimensional plate; and a fourth lidar sensor mounted to the second dimensional plate.

16. The system of claim 15, wherein a field of view of the second lidar sensor overlaps a field of view of the third lidar sensor by over 50%.

17. The system of claim 15, wherein the roof assembly further comprises a set of redundant processing systems communicatively connected to the set of roof sensors, the set of redundant processing systems configured to perform redundant perception operations on observations captured by the set of roof sensors.

18. The system of claim 12, wherein the roof assembly further comprises a set of lights communicatively coupled to a body control module (BCM) of the autonomous vehicle.

19. The system of claim 12, wherein a lateral distance between mounts of the set of mounts is adjustable.

\* \* \* \* \*